(12) United States Patent
Wardrop et al.

(10) Patent No.: US 11,530,818 B2
(45) Date of Patent: Dec. 20, 2022

(54) CONVECTIVE INDOOR AND OUTDOOR HYBRID HEATING INSTALLATION

(71) Applicant: Hybrid Energies Alternative Technologies Inc., West Vancouver (CA)

(72) Inventors: Walter Wardrop, West Vancouver (CA); Nicholas Barber, Mission (CA)

(73) Assignee: Hybrid Energies Alternative Technologies, Inc.

( * ) Notice: Subject to any disclaimer, the term of this patent is extended or adjusted under 35 U.S.C. 154(b) by 0 days.

(21) Appl. No.: 17/715,921

(22) Filed: Apr. 7, 2022

(65) Prior Publication Data

US 2022/0373186 A1 Nov. 24, 2022

Related U.S. Application Data

(62) Division of application No. 17/549,751, filed on Dec. 13, 2021, now Pat. No. 11,421,888.

(51) Int. Cl.
*F24C 1/02* (2021.01)
*F24C 1/14* (2021.01)

(52) U.S. Cl.
CPC . *F24C 1/14* (2013.01); *F24C 1/02* (2013.01)

(58) Field of Classification Search
CPC ............... F24C 1/14; F24C 1/02; Y02B 30/00
USPC ........................................................ 126/69
See application file for complete search history.

(56) References Cited

U.S. PATENT DOCUMENTS

| | | | |
|---|---|---|---|
| 4,831,941 A * | 5/1989 | Childs | ...................... F23M 9/00 110/211 |
| 6,651,647 B2 | 11/2003 | Waters | |
| 10,101,036 B2 | 10/2018 | Fuller | |
| 2009/0223512 A1 | 9/2009 | Konkle | |
| 2010/0236544 A1 | 9/2010 | Hall | |
| 2010/0237062 A1 | 9/2010 | Hall | |
| 2011/0076627 A1 | 3/2011 | DiVentura | |
| 2011/0162632 A1 | 7/2011 | DiVentura | |
| 2013/0287375 A1 | 10/2013 | Hall | |
| 2016/0348915 A1 | 12/2016 | Yang | |
| 2019/0368742 A1 | 12/2019 | Yang | |

\* cited by examiner

*Primary Examiner* — Avinash A Savani
(74) *Attorney, Agent, or Firm* — Baumgartner Patent Law; Marc Baumgartner

(57) ABSTRACT

A convection outdoor or indoor gas heater is provided, the heater comprising: a top; a first wall; a combustion chamber which includes a vent cap with a plurality of vents, the vent cap proximate to the top, the combustion chamber housed within the first wall, spaced apart from the first wall to define a first interstitial passageway, the first interstitial passageway in fluid communication with the plurality of vents; a gas burner assembly which is housed in the combustion chamber; a second wall spaced apart from the first wall to define a second interstitial passageway, the second interstitial passageway in fluid communication with the first interstitial passageway; a base which supports the first wall, the second wall and the combustion chamber; a combustion air inlet in fluid communication with the combustion chamber; an ambient air inlet in fluid communication with the second interstitial passageway; and an outlet in fluid communication with the first interstitial passageway.

12 Claims, 19 Drawing Sheets

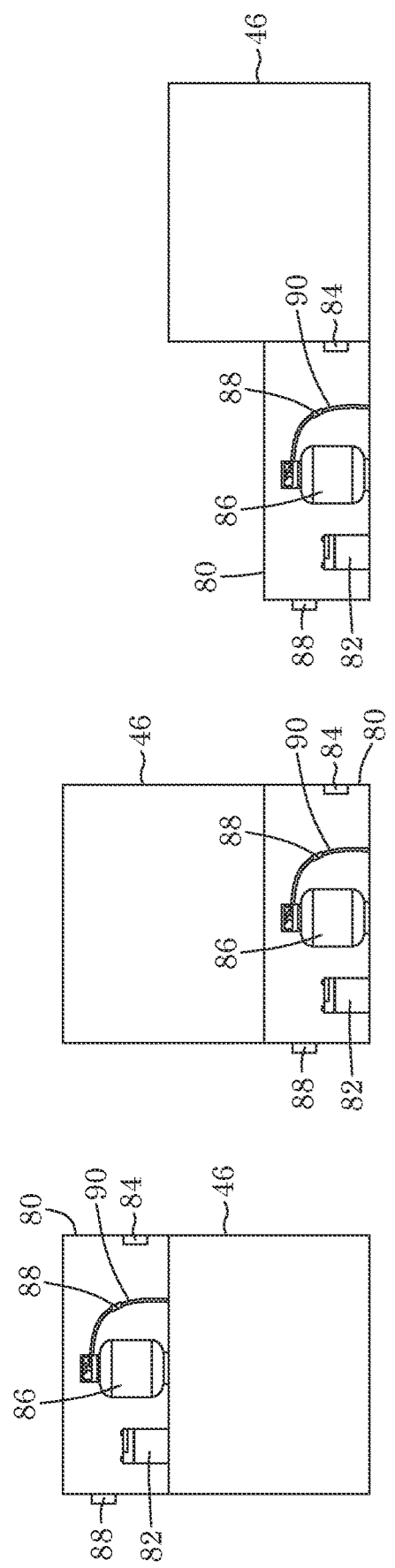

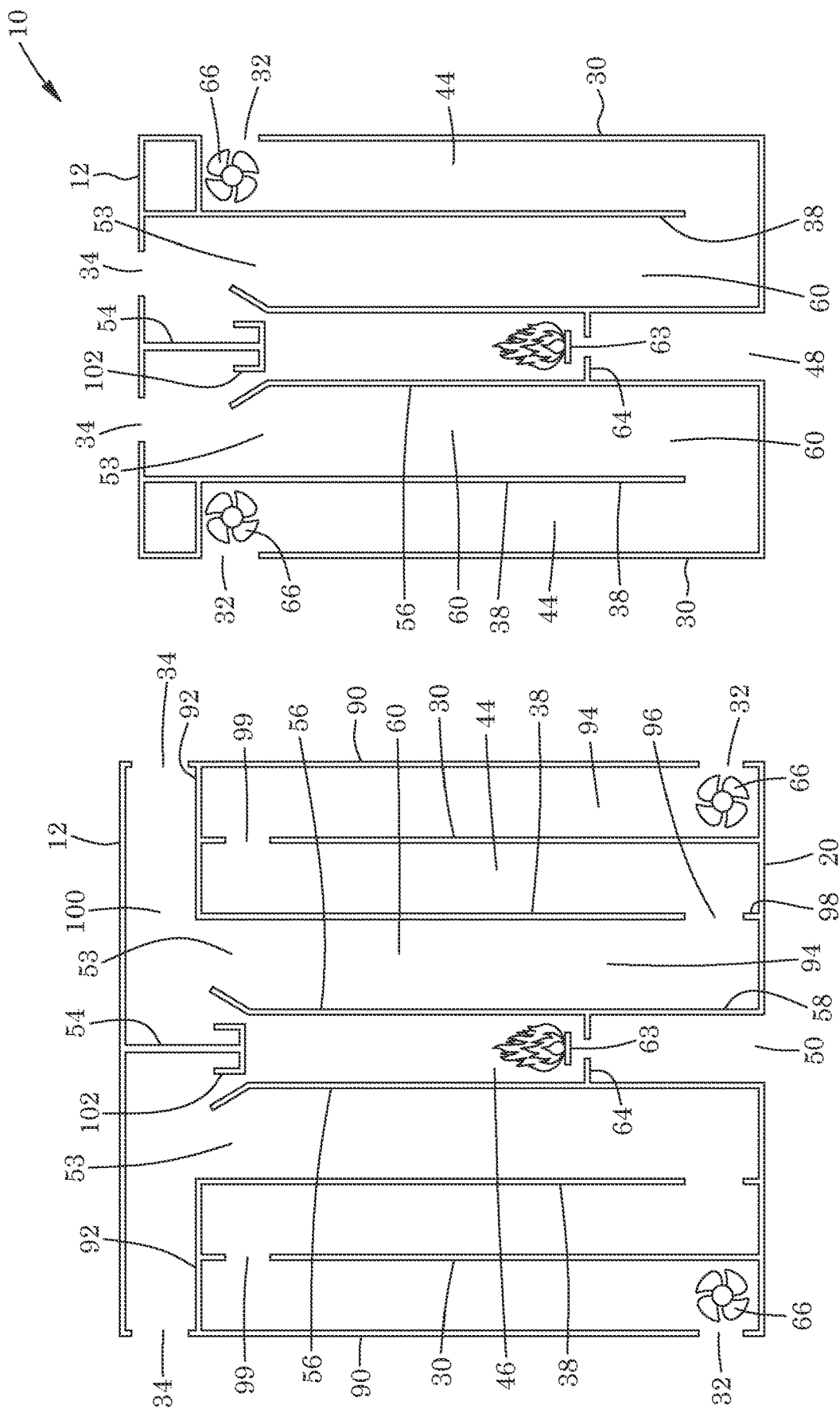

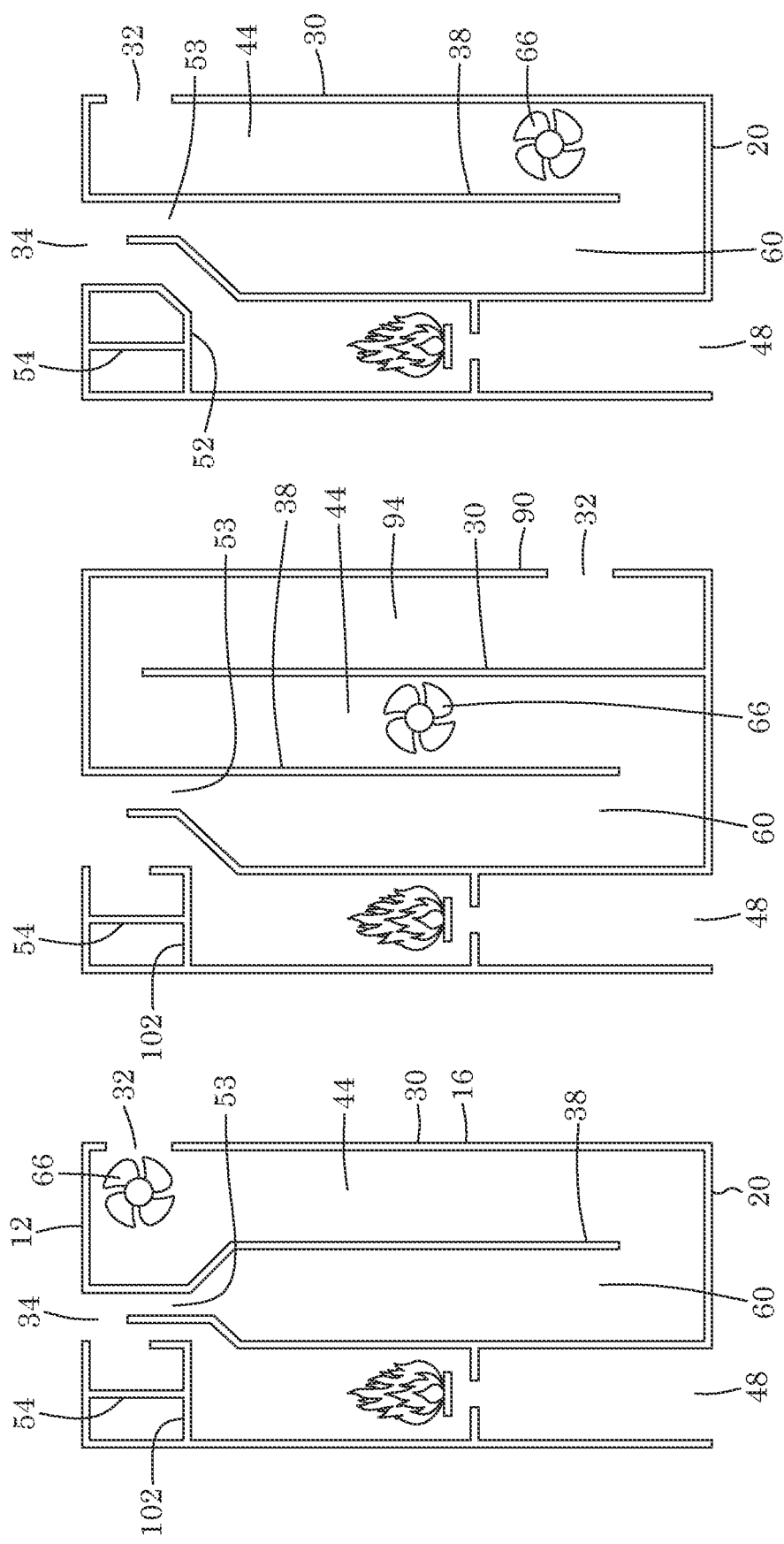

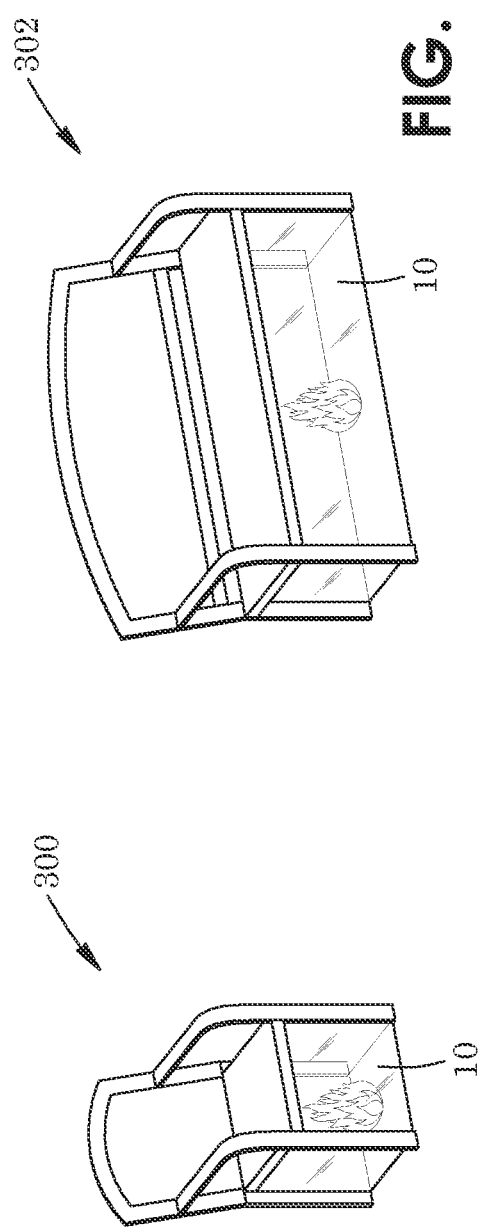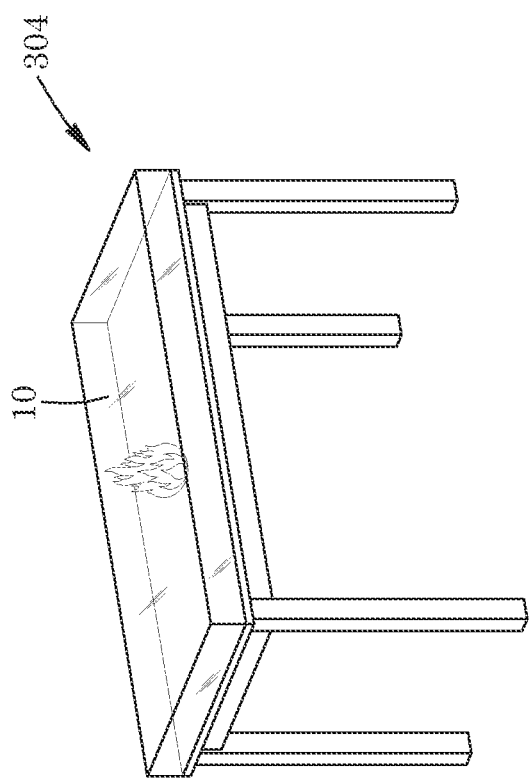
FIG. 15A
FIG. 15B
FIG. 15C

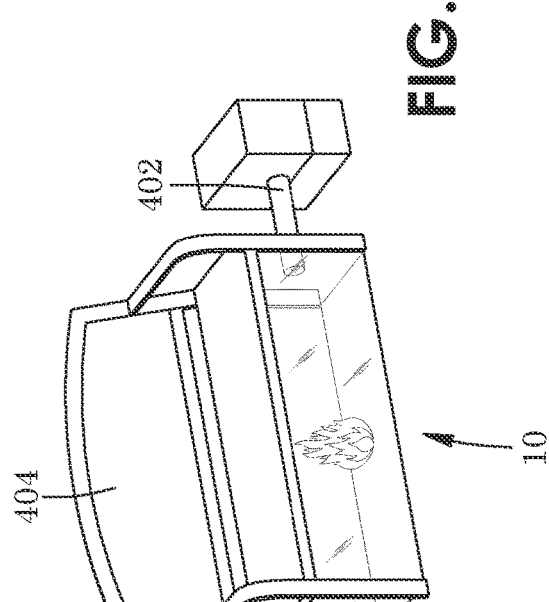
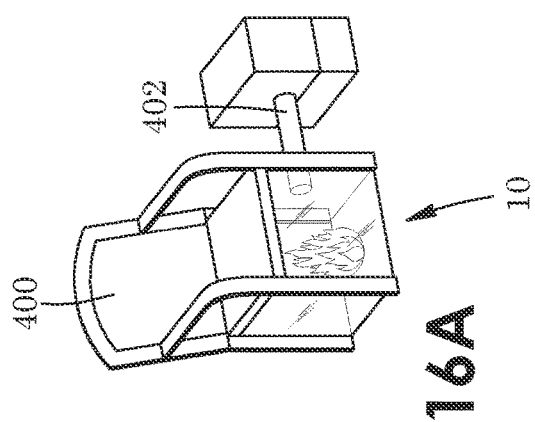
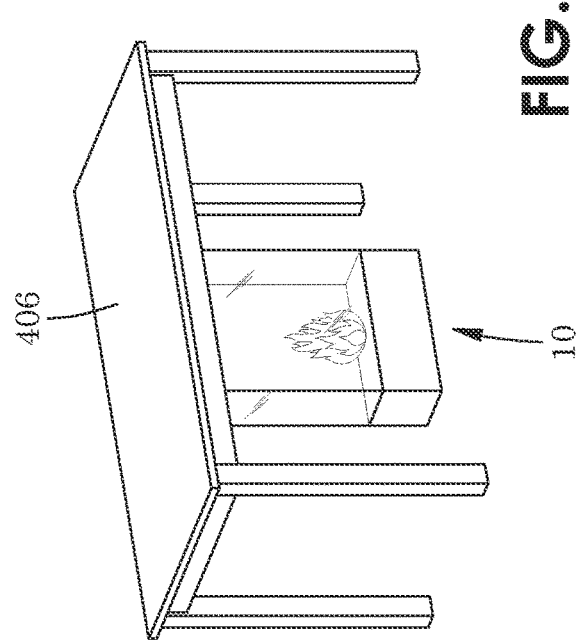

CONVECTIVE INDOOR AND OUTDOOR HYBRID HEATING INSTALLATION

CROSS REFERENCE TO RELATED APPLICATIONS

The present invention is a divisional application of U.S. patent application Ser. No. 17/549,751, filed on Dec. 13, 2021, entitled CONVECTIVE INDOOR AND OUTDOOR HYDRID HEATING SYSTEM, which claims the benefit of priority to Canadian Application Serial No. 3102578, filed on Dec. 14, 2020, entitled CONVECTIVE OUTDOOR HEATER, each of which is hereby incorporated in its entirety including all tables, figures, and claims.

FIELD

The present technology is directed to a gas fired outdoor patio heater which in some embodiments includes a second heat source. More specifically, it is a propane or natural gas heater that is cool to the touch, while providing a source of heated air that, in some embodiments, is piped to a deck, stairs, handrails or outdoor furniture and the like.

BACKGROUND

Outdoor patio heaters are very popular in colder climates, where users can extend their patio season by placing the heaters close to tables and chairs. Most, if not all provide radiant heat. An example of a radiant heat outdoor heater is a glass tower heater. These are very inefficient, heat the least amount of space and are non-directional. Mushroom style heaters also provide radiant heat and are quite inefficient, heat a small amount of space and are non-directional.

United States Patent Application Publication No. 20190368742 discloses a radiant area heater includes a columnar base with a hollow compartment and a heating column disposed on the columnar base. The heating column includes a control portion with at least one controller, a burner, and a sparker and a flame portion that includes a combustion chamber. The combustion chamber is disposed on a cylindrical member that has at least one vent allowing air to circulate to the burner and within the combustion chamber. The heating column further includes at least one heat emitting screen disposed above the flame portion that radiates heat outwards from the heater. A cover is disposed over the heating column to direct heat outwards and away from the heater. This is an inefficient, non-directional radiant heater. Inadvertently touching the heater could result in a user sustaining a burn.

United States Patent Application Publication No. 20160348915 discloses a radiant area heater includes a columnar base with a hollow compartment and a heating column disposed on the columnar base. The heating column includes a control portion with at least one controller, a burner, and a sparker and a flame portion that includes a combustion chamber. The combustion chamber is disposed on a cylindrical member that has at least one vent allowing air to circulate to the burner and within the combustion chamber. The heating column further includes at least one heat emitting screen disposed above the flame portion that radiates heat outwards from the heater. A cover is disposed over the heating column to direct heat outwards and away from the heater. This is an inefficient, non-directional radiant heater. Inadvertently touching the heater could result in a user sustaining a burn.

United States Patent Application Publication No. 20090223512 discloses an outdoor heater such as an outdoor patio heater may include a number of panels and ribs that securely couple the panels together. The heater may include a coupling assembly that easily and securely couples a support such as a pole to a tabletop, pedestal or base. The tabletop, pedestal and/or base may be formed of a variety of materials, for example, fiber-reinforced plastic, allowing a large variety of aesthetically pleasing effects. This is an inefficient, non-directional radiant heater. Inadvertently touching the heater could result in a user sustaining a burn.

United States Patent Application Publication No. 20100236544 discloses a knock-down design of an outdoor heater. An outdoor heater without resorting to knock-down designs is heavy and bulky. It is costly to ship due to its sheer size and heavy weight. A knock-down design on the other hand resorts to innovative designs in using light weight components with structural reinforcements to increase load bearing capacities thus achieve the same effect as using heavier traditional materials. A knock-down design also resorts to innovative designs in reducing component size so as to occupy a small footprint for ease of packaging and shipment. As a result, a knock-down design heater can be packaged in a footprint many times smaller than a full size heater and it weights much less than a traditional outdoor heater. It provides cost advantages in pre-sale shipment and general distribution, post-sale transportation convenience as well as ease of relocation during subsequent years of consumer usage. This is an inefficient, non-directional radiant heater. Inadvertently touching the heater could result in a user sustaining a burn.

United States Patent Application Publication Nos. 20100237062 and 20130287375 disclose an indoor or outdoor heater with a safety bar, a tiltable heater head, a power controlling and power limiting device serving as safety mechanisms. This is an inefficient, non-directional radiant heater. Inadvertently touching the heater could result in a user sustaining a burn.

United States Patent Application Publication Nos. 20110076627 and 20110162632 discloses a portable heater that includes a housing having an access door providing for receiving a fuel tank within the housing. The access door provides for insertion and removal of the fuel tank through the door. A burner within the housing is connected to the fuel tank and emits a flame above the housing. A vertical transparent tube extends above the burner and encompasses the flame along an entire height of the tube. A protective grill surrounds the tube and extends at least as far as the top of the protective grill. An upper cover assembly mounts to the top of the protective grill. The flame is enclosed extending up the tube along the entire height of the tube and creates a glowing vertical element from the housing to the cover. This is a very inefficient, non-directional radiant heater. Inadvertently touching the heater could result in a user sustaining a burn.

U.S. Pat. No. 6,651,647 discloses a heating apparatus that includes a burner assembly for igniting fuel from a fuel source, an upper housing for the burner assembly, and an elongate support member extending upwardly to the burner assembly housing to space the housing from ground level. A shroud is spaced from the burner assembly by the elongate support member, is configured for slidably engaging the elongate support member and is dimensioned for surrounding the fuel source. An emitter surface of the housing is inclined relative to a longitudinal axis of the burner assembly for maximum efficiency in warming of a preselected area by the heat emitted from the housing. At least three legs support the elongate support member above a base and define a space for accommodating a gas cylinder serving as the fuel source. A dome is mountable above the burner assembly and a single carton is provided for enclosing the disassembled assembly. This is an inefficient, non-directional radiant heater. Inadvertently touching the heater could result in a user sustaining a burn.

U.S. Pat. No. 10,101,036 discloses a heater with a visual flame display. The heater may include a top portion and a base, separated by concentric cylinders. The innermost cylinder houses a flame element, which may be spun into a vortex. The cylinders may be constructed from transparent materials such that the flame element is visible to an observer. The base provides heat at or near ground level for efficient heat distribution. This is a non-directional convection heater. It does not utilize all the heat that is available as it separates exhaust gases from the air being heated.

What is needed is an efficient heater. It would be preferable if it provided convective heat derived from the exhaust gas and heated ambient air. It would be preferable if the heat was directional. It would be further preferable if the heater was cool to the touch. It would be preferable if the heat was directed downward in some embodiments. It would be preferable if it heated a large area. It would be further preferable if it included a second heat source and was therefore a hybrid heater. It would be further preferable if the heater was part of a system in which the hot air was vented to ducting for heating an area, a zone, a structure or furniture remote to the heater. It would be further preferable if a manifold was included in the system for distributing the hot air.

SUMMARY

The present technology is an efficient heater that provides convective heat derived from both the exhaust gas and heated ambient air. The heat is directional. The heat is directed downward in some embodiments. The heater is cool to the touch. The heater heats a large area. It includes a second heat source and is therefore a hybrid heater. The heater is part of a system in which the hot air was vented to ducting for heating an area, a zone, a structure or furniture remote to the heater. A manifold is included in the system for distributing the hot air.

In one embodiment, an outdoor gas heater installation is provided, the outdoor gas heater installation comprising a box, a lift mechanism, at least one duct and a convection outdoor gas heater, wherein:
the box includes sides, a bottom and at least one outlet;
the lift mechanism is housed within the box;
the at least one duct is in fluid communication with the outlet; and
the convective outdoor gas heater comprises: a top; a base; a pair of sides; a first wall which is attached to the top, the base and the pair of sides; a combustion chamber which includes combustion chamber wall and a combustion chamber outlet, the combustion chamber outlet proximate to the top or in the top, the combustion chamber wall spaced apart from the first wall to define a first interstitial passageway, the first interstitial passageway in fluid communication with the combustion chamber outlet; a gas burner assembly which is housed in the combustion chamber; a leg extending outward from the first wall; a second wall, which is attached to the pair of sides and the leg and is spaced apart from the first wall to define a second interstitial passageway, the second interstitial passageway in fluid communication with the first interstitial passageway; a base which supports the first wall, the second wall and the combustion chamber; a combustion air inlet in fluid communication with the combustion chamber; an air inlet in fluid communication with the second interstitial passageway; an air pressurizing device in fluid communication with the first interstitial passageway and the second interstitial passageway; and an outlet in the base which is in fluid communication with the first interstitial passageway, wherein the convective outdoor gas heater is mounted on the lift mechanism and in a stowed position is housed within the box and in an operational position, the base and the box form a manifold.

In the outdoor gas heater installation, the combustion chamber outlet may be a venturi.

In the outdoor gas heater installation, the air pressuring device may be a fan.

In the outdoor gas heater installation, the fan may be in the second interstitial passageway.

The outdoor gas heater installation may further include a mechanical and electrical box in communication with the fan and the lift mechanism.

In the outdoor gas heater installation, the first wall, the first interstitial passageway, the second wall, the second interstitial passageway and the air inlet may be mirrored on a second side of the combustion chamber of the convective outdoor gas heater.

In the outdoor gas heater installation, the first wall and the second wall may be transparent, semi-transparent or translucent.

In the outdoor gas heater installation, the convective outdoor gas heater may further include a third wall outside of the second wall, the third wall and the second wall defining a third interstitial passageway which is in fluid communication with the second interstitial passageway via the air inlet and which includes an ambient air inlet.

In the outdoor gas heater installation, the first wall, the first interstitial passageway, the second wall, the second interstitial passageway, the third wall, the third interstitial passageway and the air inlet may be mirrored on a second side of the combustion chamber of the convection gas heater.

In the outdoor gas heater installation, the first wall, the second wall and the third wall may be transparent, semi-transparent or translucent.

In the outdoor gas heater installation, the convective outdoor gas heater may further comprise at least one additional heating source, the additional heating source selected from the group consisting of an electric element, a heat pump, an infrared element and a heat exchanger.

The outdoor gas heating installation may further comprise:
ducting, which is in fluid communication with the outlet; and
a hollow structure which is in fluid communication with the ducting, the hollow structure selected from the group consisting of at least one article of outdoor furniture, a stair tread, a handrail, event seating and a deck, wherein the convective outdoor gas heater is in fluid communication with the hollow structure via the ducting.

In one embodiment, a convective gas heater is provided, the convective gas heater comprising: a top; a base; a pair of sides; a first wall which is attached to the top, the base and the pair of sides; a combustion chamber which includes combustion chamber wall and a combustion chamber outlet, the combustion chamber outlet proximate to the top or in the top, the combustion chamber wall spaced apart from the first wall to define a first interstitial passageway, the first interstitial passageway in fluid communication with the combustion chamber outlet; a gas burner assembly which is housed in the combustion chamber; a leg extending outward from the first wall; a second wall, which is attached to the pair of sides and the leg and is spaced apart from the first wall to define a second interstitial passageway, the second interstitial passageway in fluid communication with the first interstitial passageway; a base which supports the first wall, the second wall and the combustion chamber; a combustion air inlet in fluid communication with the combustion chamber; an air inlet in fluid communication with the second interstitial passageway; an air pressurizing device in fluid communication with the first interstitial passageway and the second interstitial passageway; and an outlet in the base which is in fluid communication with the first interstitial passageway.

In the convective gas heater, the combustion chamber outlet may be a venturi.

In the convective gas heater, the air pressuring device may be a fan.

In the convective gas heater, the fan may be in the second interstitial passageway.

In the convective gas heater, the first wall and the second wall may be transparent, semi-transparent or translucent.

The convective gas heater may further comprise a manifold, the manifold in fluid communication with the air outlet.

In the convective gas heater, the first wall, the first interstitial passageway, the second wall, the second interstitial passageway and the air inlet may be mirrored on a second side of the combustion chamber of the convection gas heater.

The convective gas heat may comprise a third wall outside of the second wall, the third wall and the second wall defining a third interstitial passageway which is in fluid communication with the second interstitial passageway via the air inlet and which includes an ambient air inlet.

In the convective gas heater, the first wall, the first interstitial passageway, the second wall, the second interstitial passageway, the third wall, the third interstitial passageway and the air inlet may be mirrored on a second side of the combustion chamber of the convection gas heater.

In another embodiment, an outdoor gas heater system is provided, the outdoor gas heater system comprising a box, a lift mechanism, at least one duct and a convection outdoor gas heater, wherein:
 the box includes sides, a bottom and at least one outlet;
 the lift mechanism is housed within the box;
 the at least one duct is in fluid communication with the outlet; and
 the convective outdoor heater comprises: a top; a base; a pair of sides; a first wall which is attached to the top, the base and the pair of sides; a combustion chamber which includes combustion chamber wall and a combustion chamber outlet, the combustion chamber outlet proximate to the top or in the top, the combustion chamber wall spaced apart from the first wall to define a first interstitial passageway, the first interstitial passageway in fluid communication with the combustion chamber outlet; a gas burner assembly which is housed in the combustion chamber; a leg extending outward from the first wall; a second wall, which is attached to the pair of sides and the leg and is spaced apart from the first wall to define a second interstitial passageway, the second interstitial passageway in fluid communication with the first interstitial passageway; a base which supports the first wall, the second wall and the combustion chamber; a combustion air inlet in fluid communication with the combustion chamber; an air inlet in fluid communication with the second interstitial passageway; an air pressurizing device in fluid communication with the first interstitial passageway and the second interstitial passageway; and an outlet in the base which is in fluid communication with the first interstitial passageway, wherein the convection outdoor gas heater is mounted on the lift mechanism and in a stowed position is housed within the box and in an operational position, the base and the box form a manifold.

In the outdoor gas heater system, the combustion chamber outlet may be a venturi.

In the outdoor gas heater system, the air pressuring device may be a fan.

In the outdoor gas heater system, the fan may be in the second interstitial passageway.

In the outdoor gas heater system, the first wall and the second wall may be transparent, semi-transparent or translucent.

The outdoor gas heater system may further include a mechanical and electrical box in communication with the fan and the lift mechanism.

In the outdoor gas heater system, the convective gas heater may further include a third wall outside of the second wall, the third wall and the second wall defining a third interstitial passageway which is in fluid communication with the second interstitial passageway via the air inlet and which includes an ambient air inlet.

In the outdoor gas heater system, one or more of the second wall or third wall of the convective gas heater may be a switchable privacy glass or is coated with a switchable privacy film.

In the outdoor gas heater system, the first wall and the second wall of the convective outdoor gas heater may be cylindrical.

In the outdoor gas heater system, the first wall, the second wall and the third wall of the convective gas heater may be cylindrical.

In the outdoor gas heater system, there may be a plurality of outlets and a door on at least one of the plurality of outlets of the convective gas heater.

In the outdoor gas heater system, the first wall and the second wall of the convective gas heater may be planar.

In the outdoor gas heater system, the first wall, the first interstitial passageway, the second wall, the second interstitial passageway and the air inlet may be mirrored on a second side of the combustion chamber of the convective gas heater.

In the outdoor gas heater system, the first wall and the second wall of the convective gas heater may be rectangular.

In the outdoor gas heater system, the convective gas heater may further comprise at least one additional heating source, the additional heating source selected from the group consisting of an electric element, a heat pump, an infrared element and a heat exchanger.

In another embodiment, an installation is provided, the installation comprising:
 a convective gas heater, the convective gas heater comprising: a top; a base; a pair of sides; a first wall which is attached to the top, the base and the pair of sides; a combustion chamber which includes combustion chamber wall and a combustion chamber outlet, the combustion chamber outlet proximate to the top or in the top, the combustion chamber wall spaced apart from the first wall to define a first interstitial passageway, the first interstitial passageway in fluid communication with the combustion chamber outlet; a gas burner assembly which is housed in the combustion chamber; a leg extending outward from the first wall; a second wall, which is attached to the pair of sides and the leg and is spaced apart from the first wall to define a second interstitial passageway, the second interstitial passageway in fluid communication with the first interstitial passageway; a base which supports the first wall, the second wall and the combustion chamber; a combustion air inlet in fluid communication with the combustion chamber; an air inlet in fluid communication with the second interstitial passageway; an air pressurizing device in fluid communication with the first interstitial passageway and the second interstitial passageway; and an outlet in the base which is in fluid communication with the first interstitial passageway;

ducting, which is in fluid communication with the outlet; and a hollow structure which is in fluid communication with the ducting, the hollow structure selected from the group consisting of at least one article of outdoor furniture, a stair tread, a handrail, event seating and a deck, wherein the convective gas heater is in fluid communication with the hollow structure via the ducting.

In the installation, the convective gas heater may further comprise an additional heat source, the additional heat source selected from the group consisting of an electric element, a heat pump, an infrared element and a heat exchanger.

In the installation, the ducting may form a manifold.

FIGURES

FIG. 5A is a side view of the electrical and mechanical box and the combustion chamber, with the electrical and mechanical box above the combustion chamber; FIG. 5B is a side view of the electrical and mechanical box and the combustion chamber, with the electrical and mechanical box below the combustion chamber; and FIG. 5C is a side view of the electrical and mechanical box and the combustion chamber, with the electrical and mechanical box beside the combustion chamber.

Figure 1:
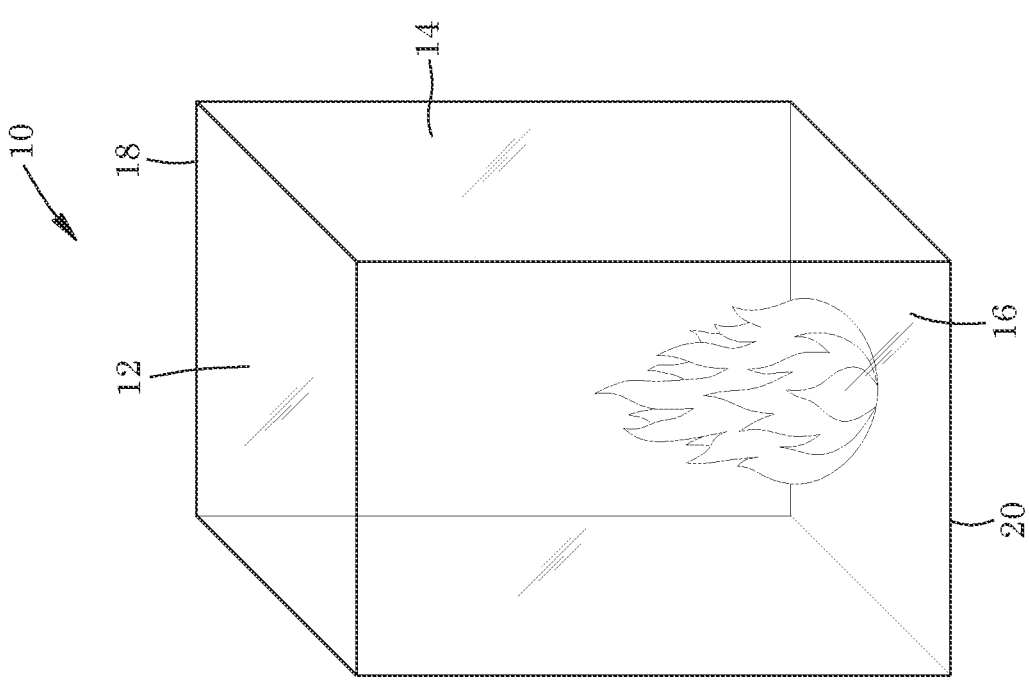
FIG. 1 is a perspective view of the outdoor patio heater of the present technology.
Figure 6:
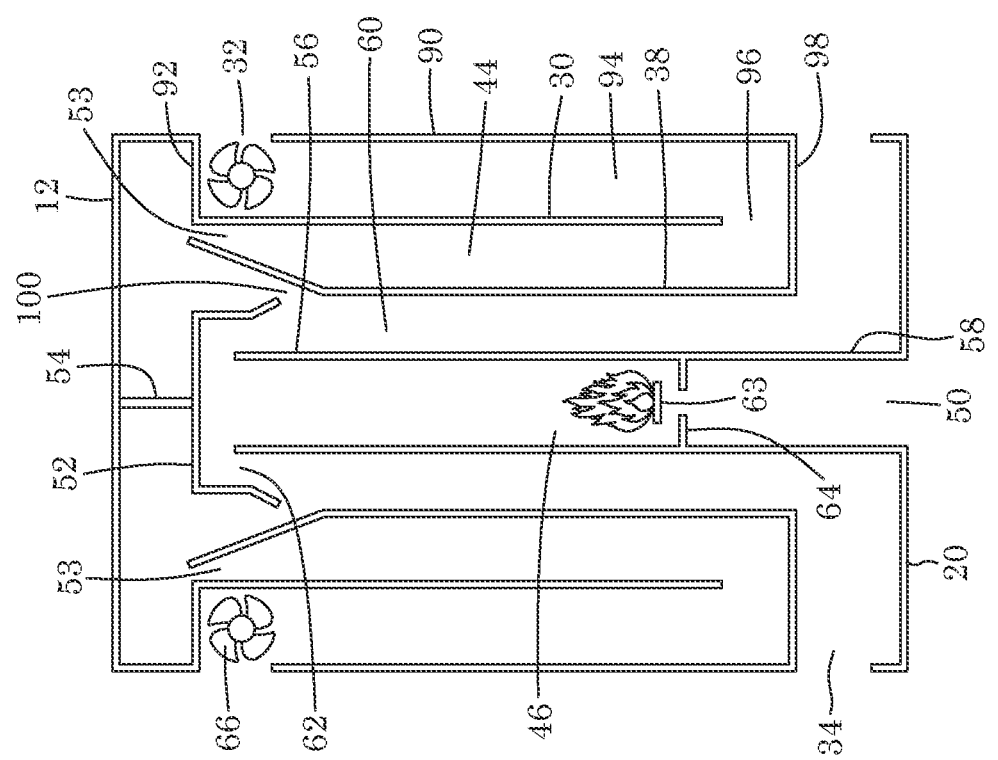

FIG. 6 is a side sectional view of an alternative embodiment of the outdoor patio heater of FIG. 1.

FIG. 7 is a side sectional view of an alternative embodiment of the outdoor patio heater of FIG. 1.

FIG. 8 is a side sectional view of an alternative embodiment of the outdoor patio heater of FIG. 1.

Figure 9B:
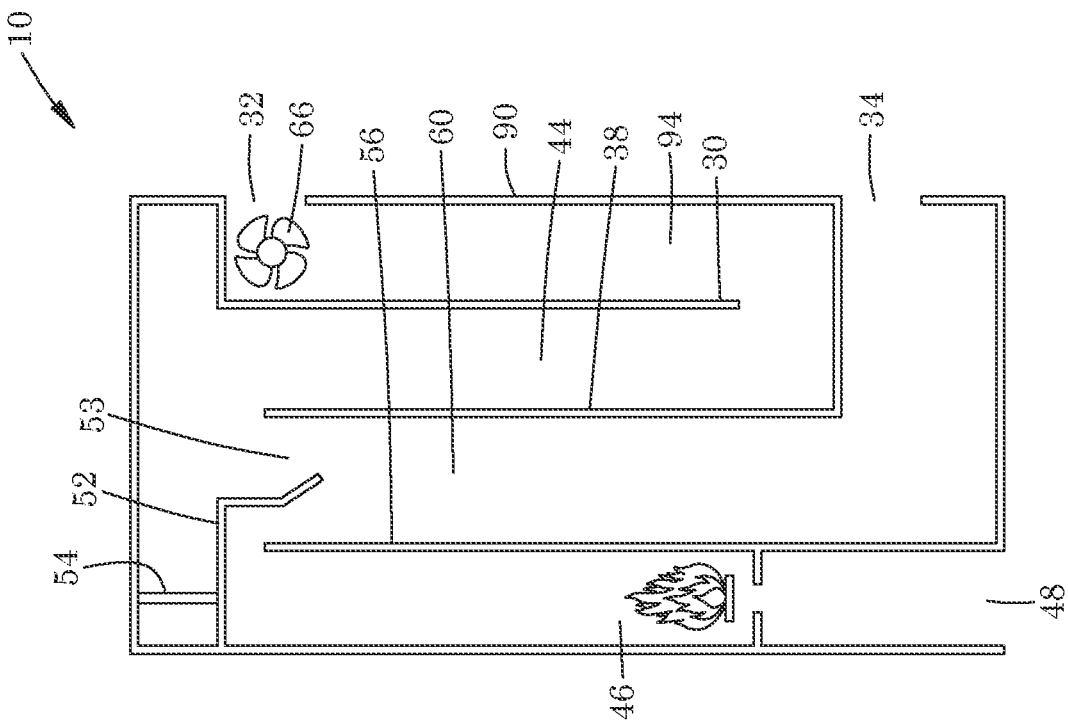
Figure 9A:
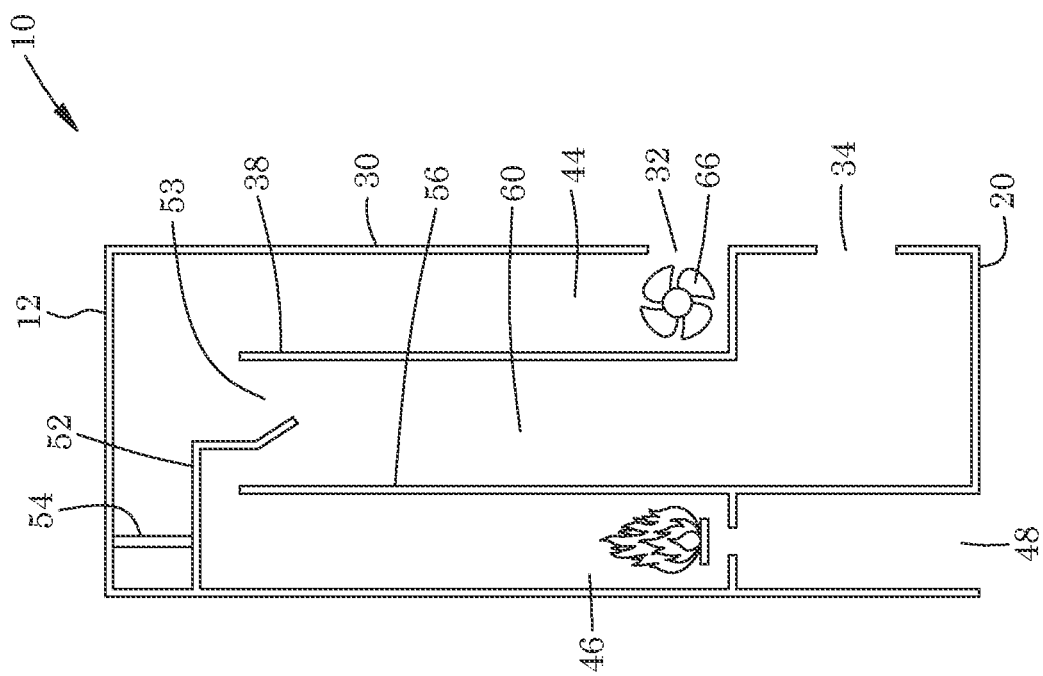

FIG. 9A is a side sectional view of an alternative embodiment of the outdoor patio heater of FIG. 1; and FIG. 9B is a side sectional view of another alternative embodiment of the outdoor patio heater of FIG. 1.

FIG. 10A is a side sectional view of an alternative embodiment of the outdoor patio heater of FIG. 1; FIG. 10B is a side sectional view of another alternative embodiment of the outdoor patio heater of FIG. 1, and FIG. 10C is a side sectional view of another alternative embodiment of the outdoor patio heater of FIG. 1.

Figure 11B:
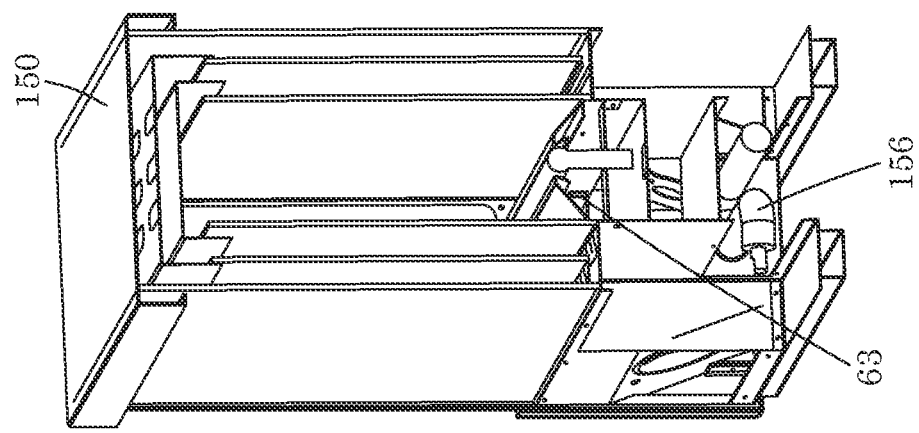
Figure 11A:
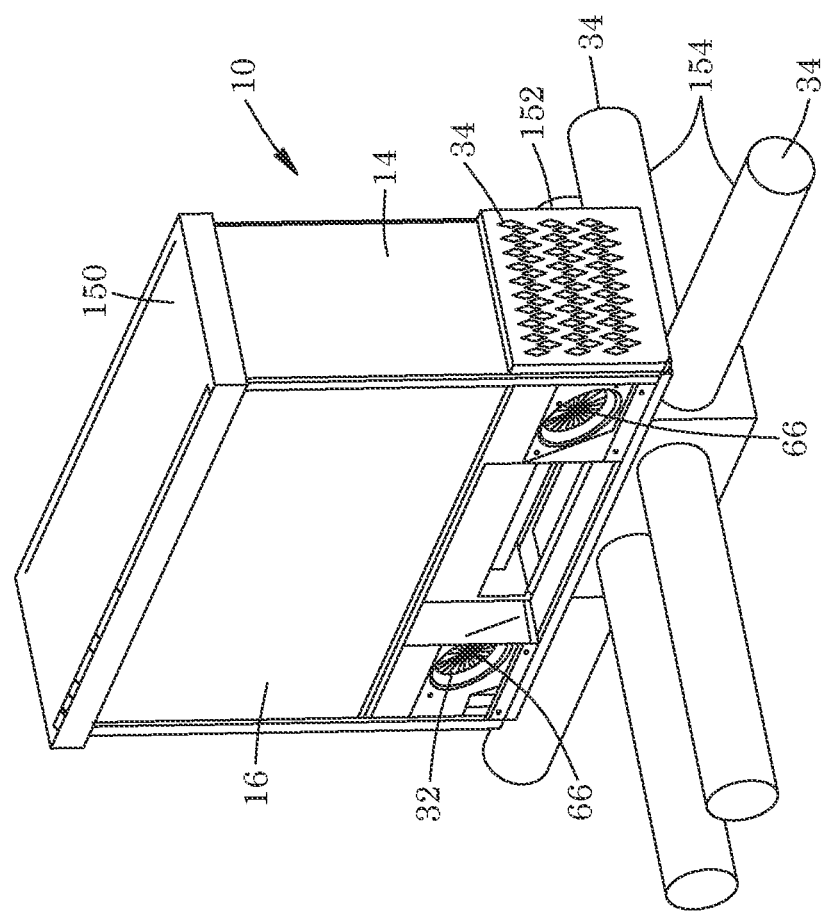

FIG. 11A is a perspective view of an alternative embodiment outdoor patio heater of FIG. 1; and FIG. 11B is a perspective section view of the alternative embodiment outdoor patio heater of FIG. 1.

Figure 12:
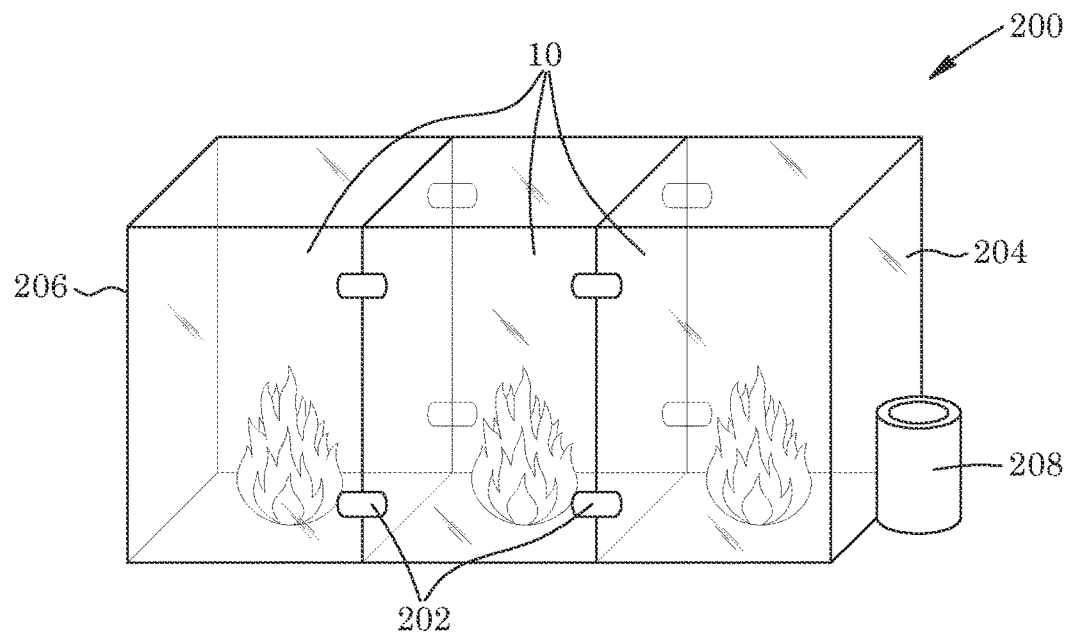

FIG. 12 is a schematic showing a privacy wall of outdoor patio heaters.

Figure 13:
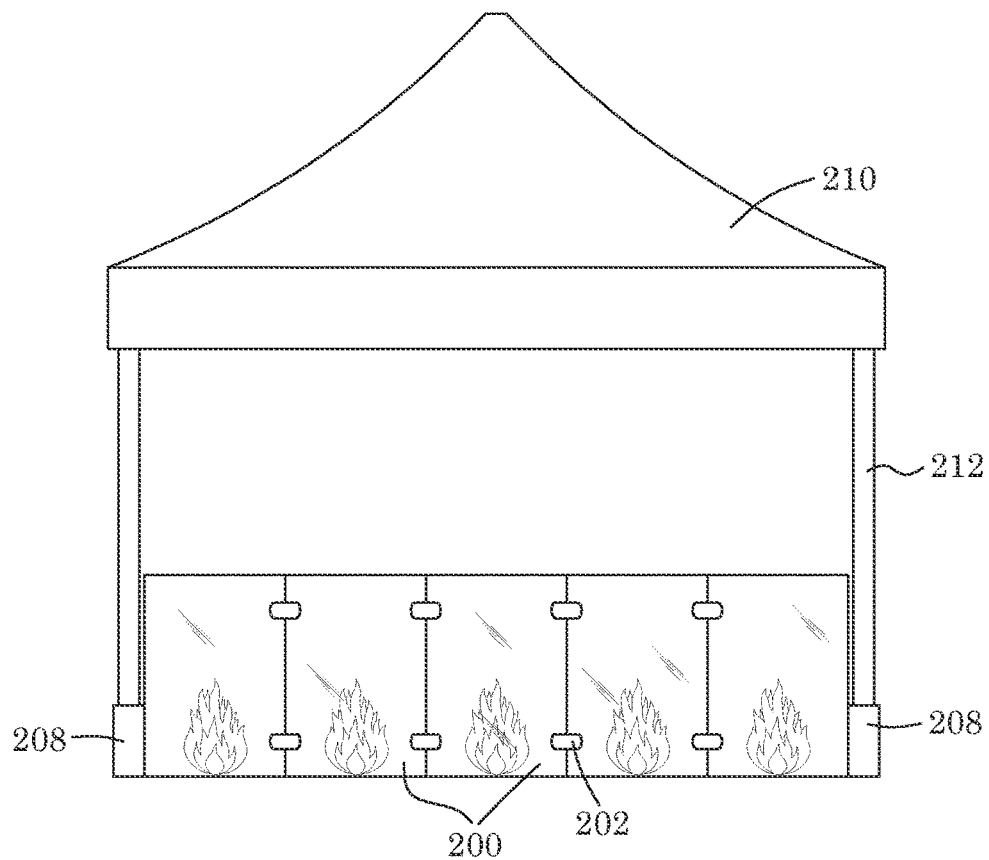

FIG. 13 is a schematic showing the privacy wall configured to retain an event tent.

Figure 14A:
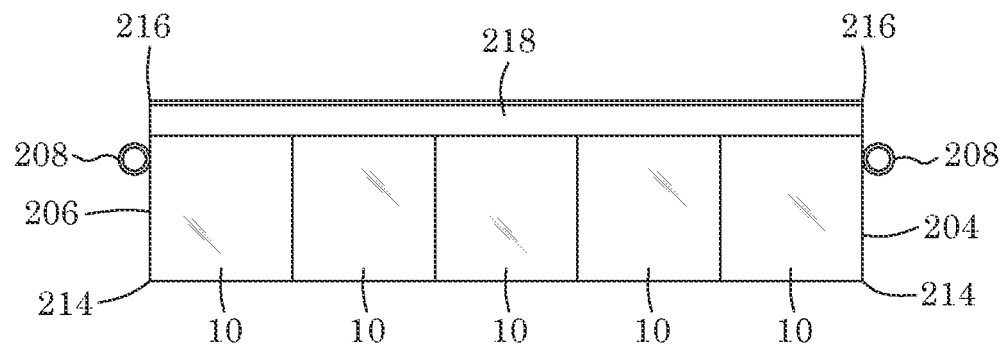
Figure 14B:
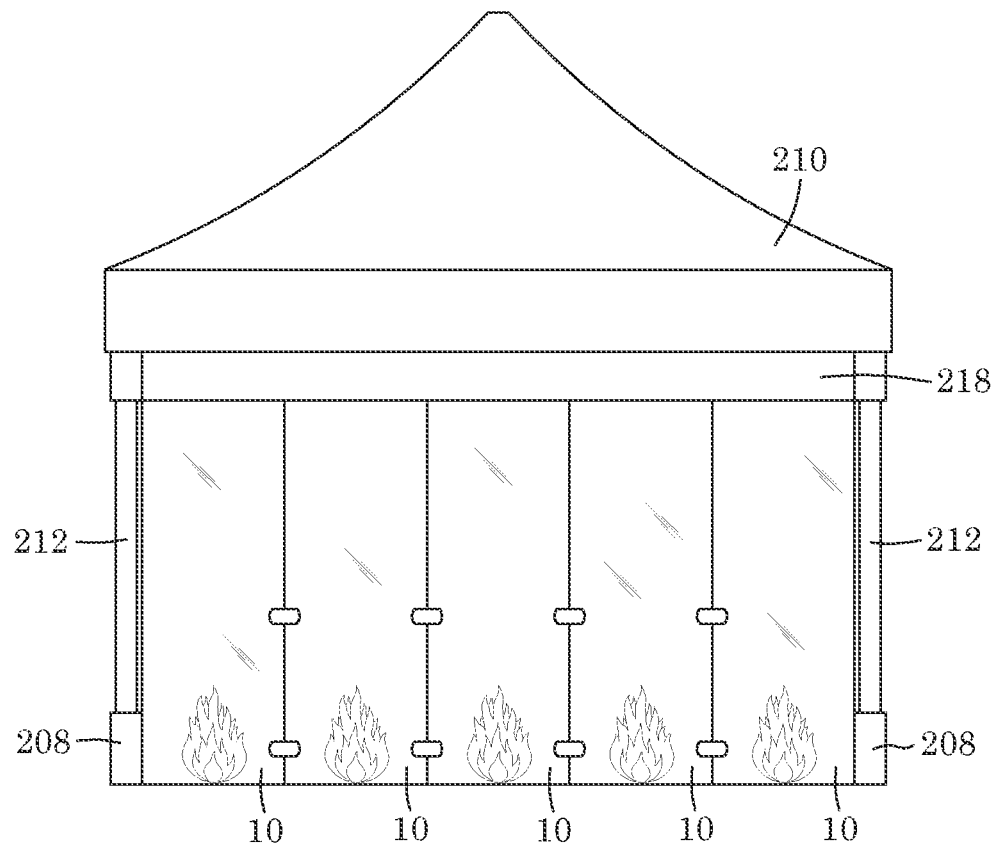

FIG. 14A is a schematic of an installation of a privacy wall; and FIG. 14B is a schematic of an installation of a privacy wall and an event tent.

FIG. 15A is a schematic of the heater as a seat; FIG. 15B is a schematic of the heater as a bench; and FIG. 15C is a schematic of the heater as a table.

Figure 16D:
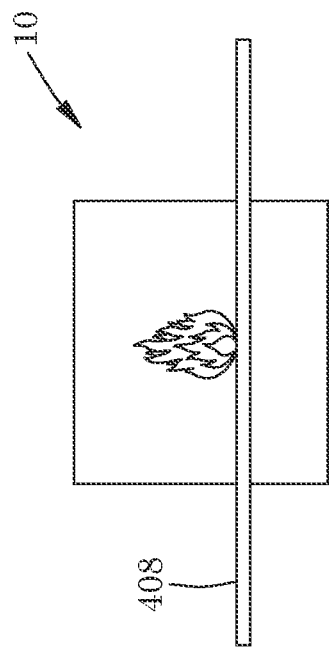
Figure 16E:
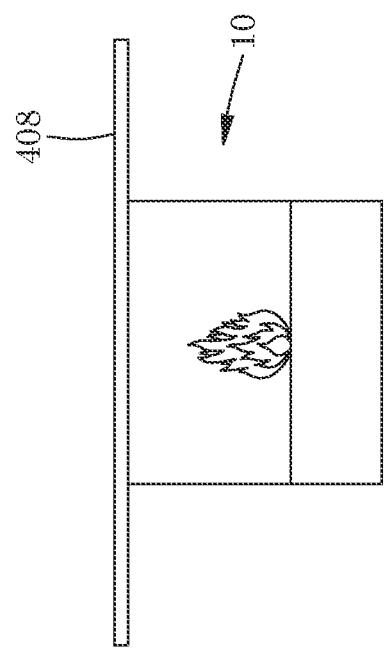
Figure 16F:
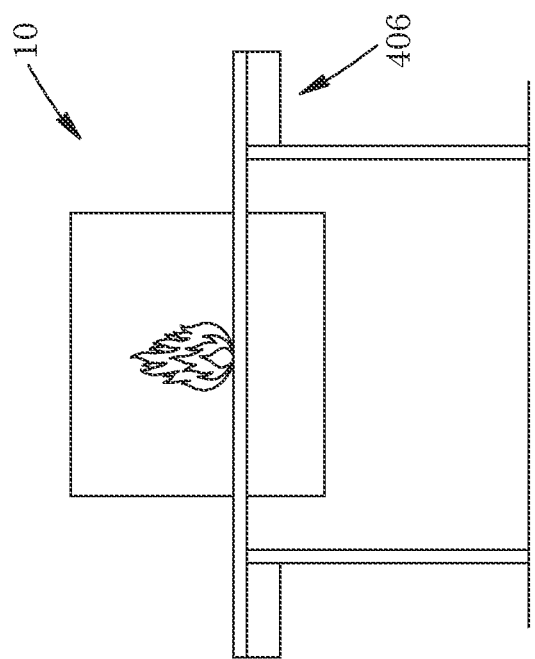

FIG. 16A is a schematic of the heater in fluid communication with the seat;

FIG. 16B is a schematic of the heater in fluid communication with the bench; FIG. 16C is a schematic of the heater under the table; FIG. 16D is a schematic of the heater partially above the table; FIG. 16E is a schematic of the heater partially below the deck or flooring; and FIG. 16F is a schematic of the heater suspended under the deck or floor.

Figure 17:
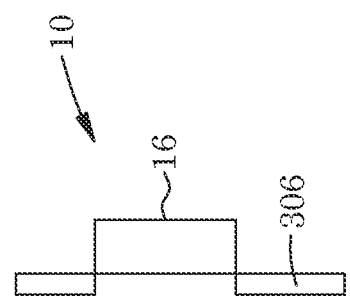

FIG. 17 is a side view of the outdoor patio heater of FIGS. 10A, 101B, 15A and 15B in an exterior wall.

Figure 18:
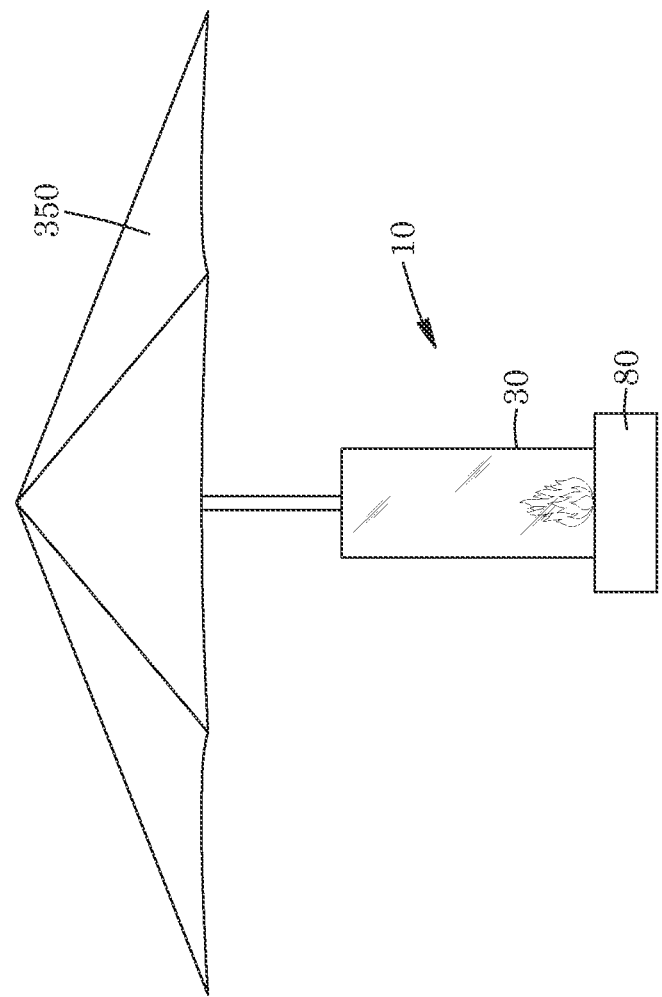

FIG. 18 is a side view of the outdoor patio heater and patio umbrella.

Figure 19:
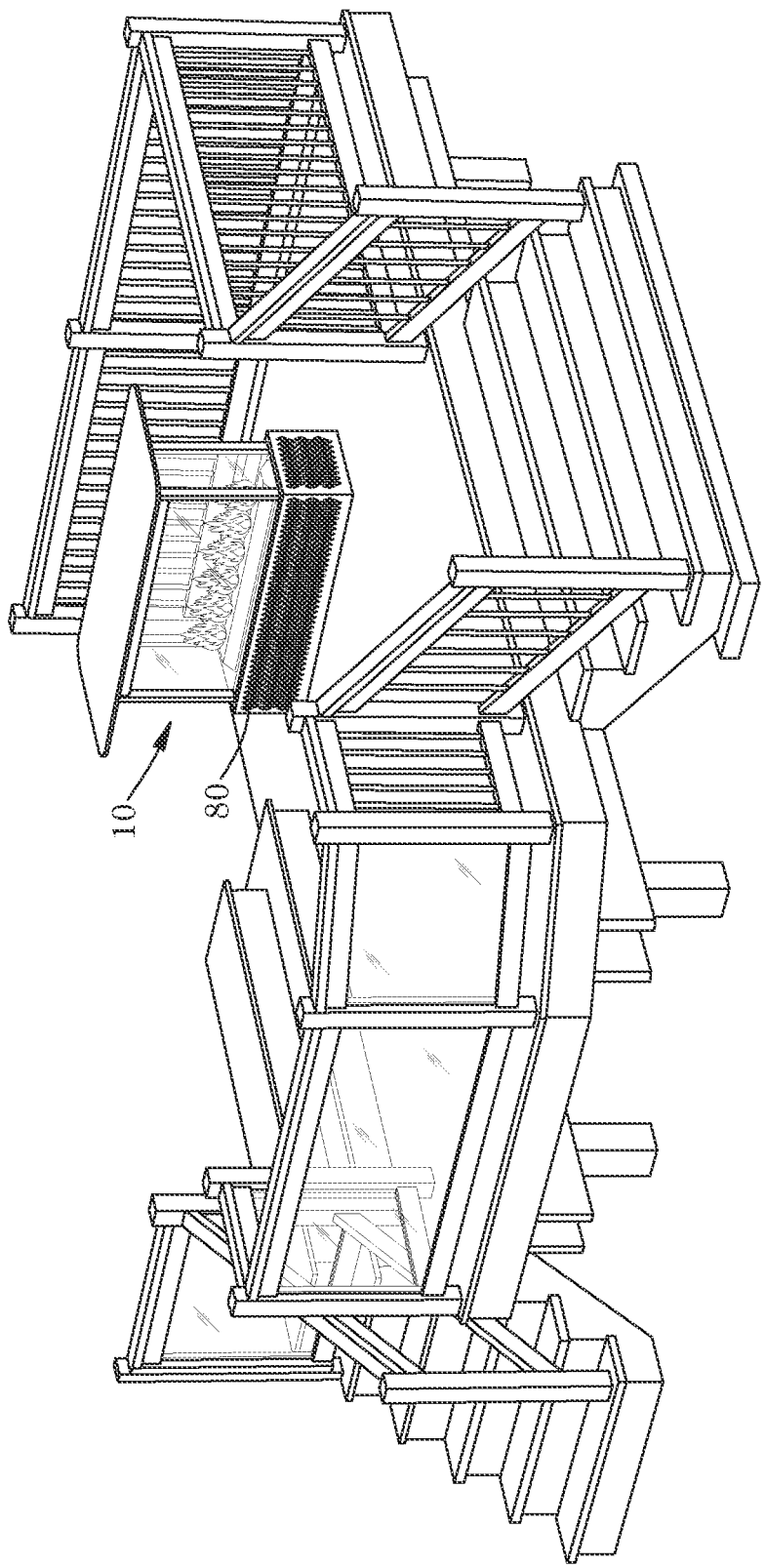

FIG. 19 is a schematic of the outdoor patio heater on a deck.

Figure 20A:
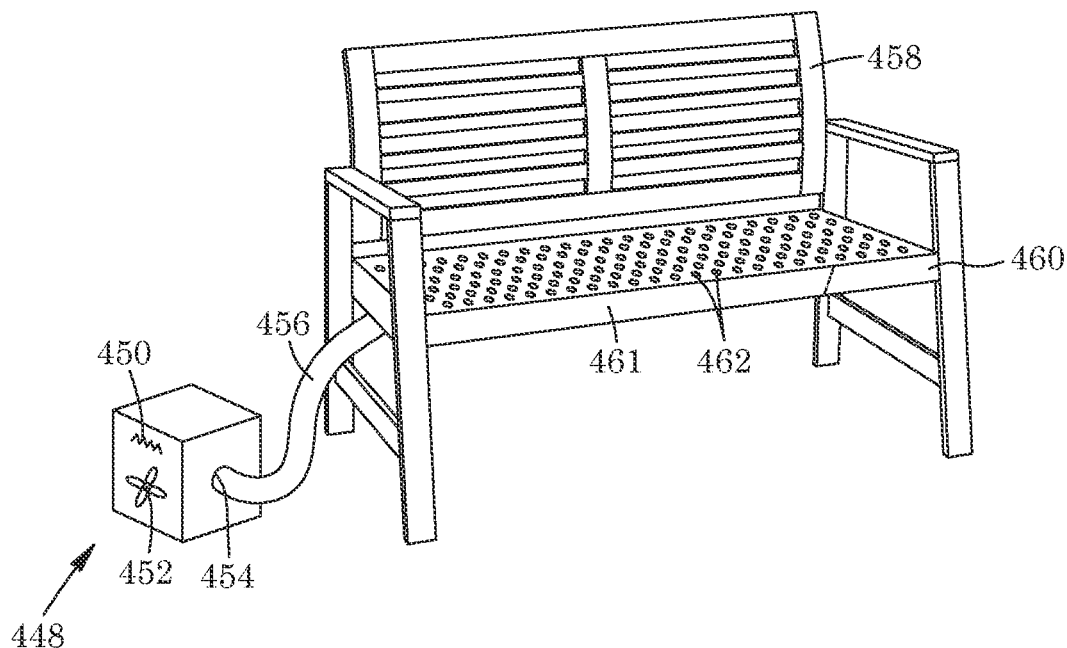
Figure 20B:
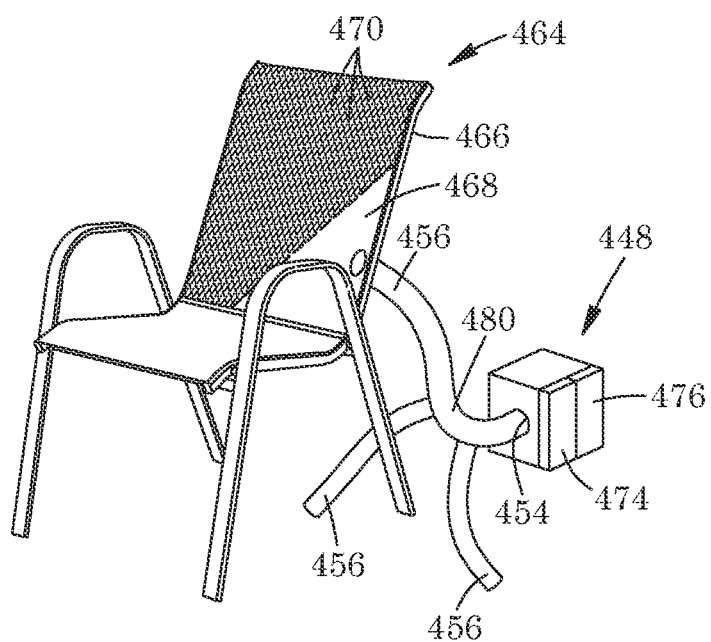

FIG. 20A is a partial cutaway perspective view of a hybrid heater for outdoor furniture; and FIG. 20B is a partial cutaway perspective view of a heated outdoor chair.

Figure 21A:
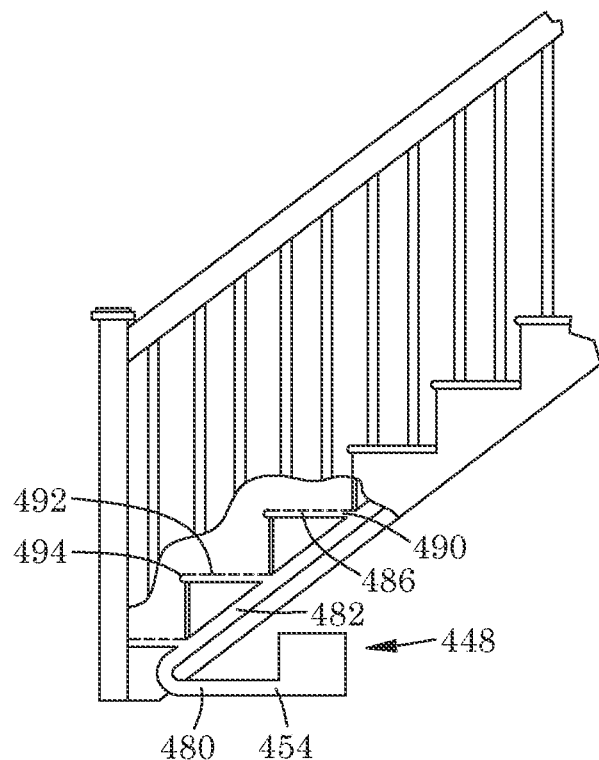
Figure 21B:
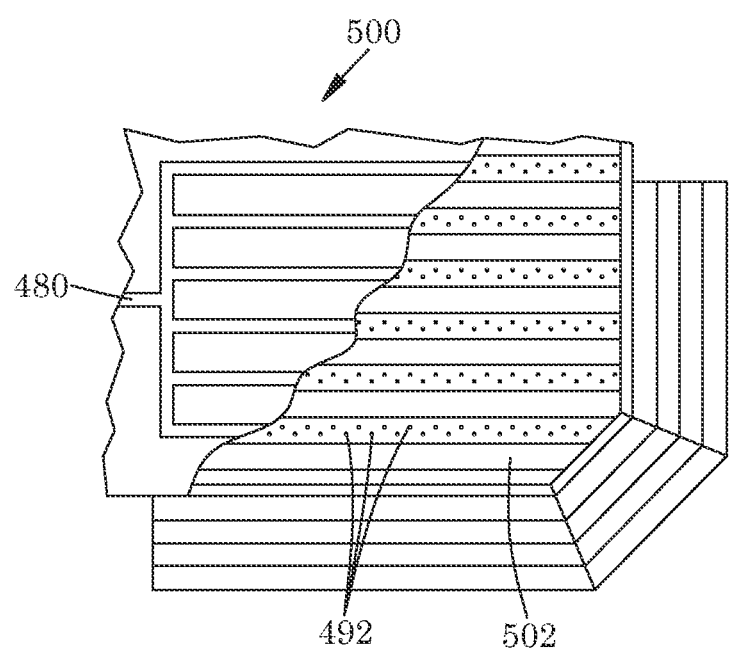

FIG. 21A is partial cutaway side view of heated stairs; and FIG. 21B is a partial cutaway of a top view of a heated deck.

Figure 22:
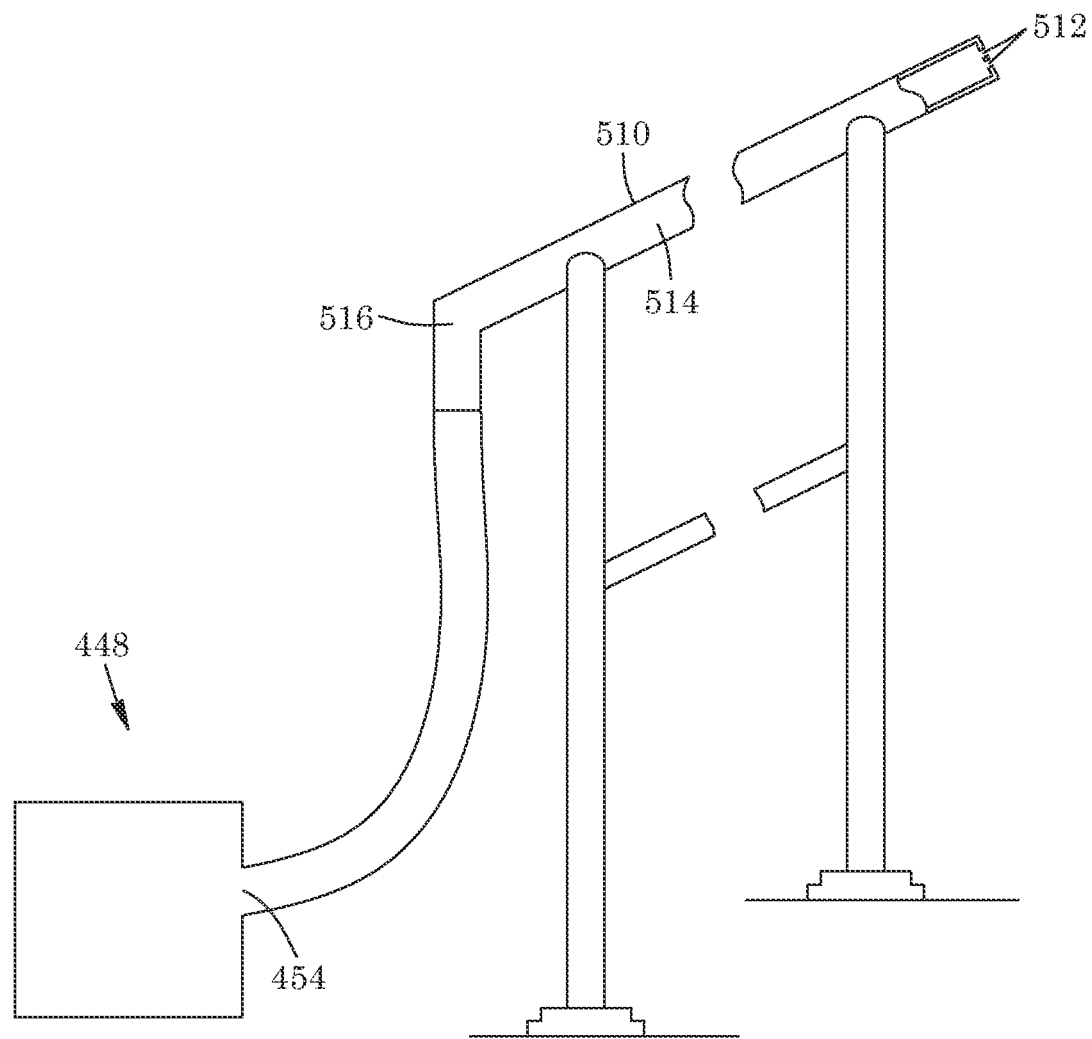

FIG. 22 is a side sectional view of a heated handrail.

Figure 23A:
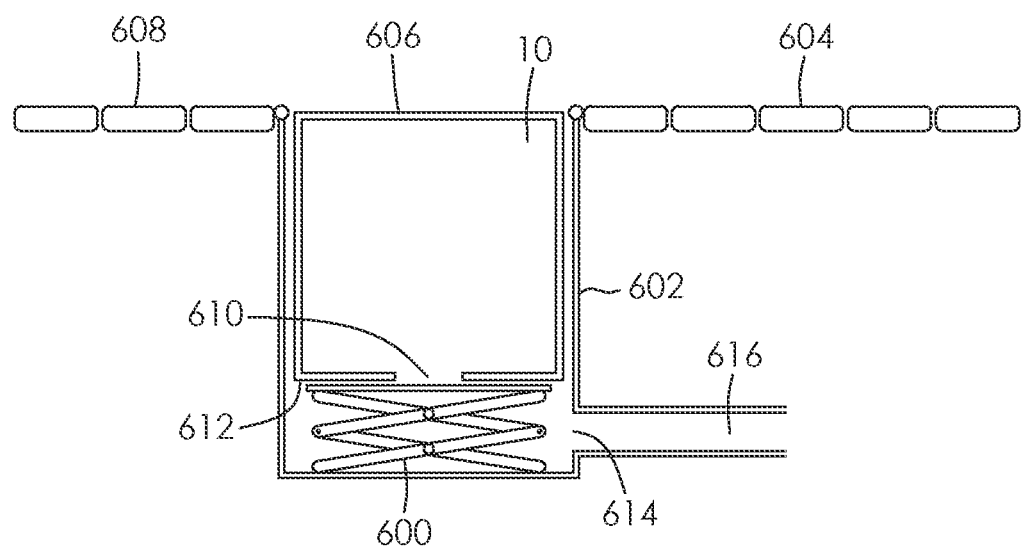
Figure 23B:
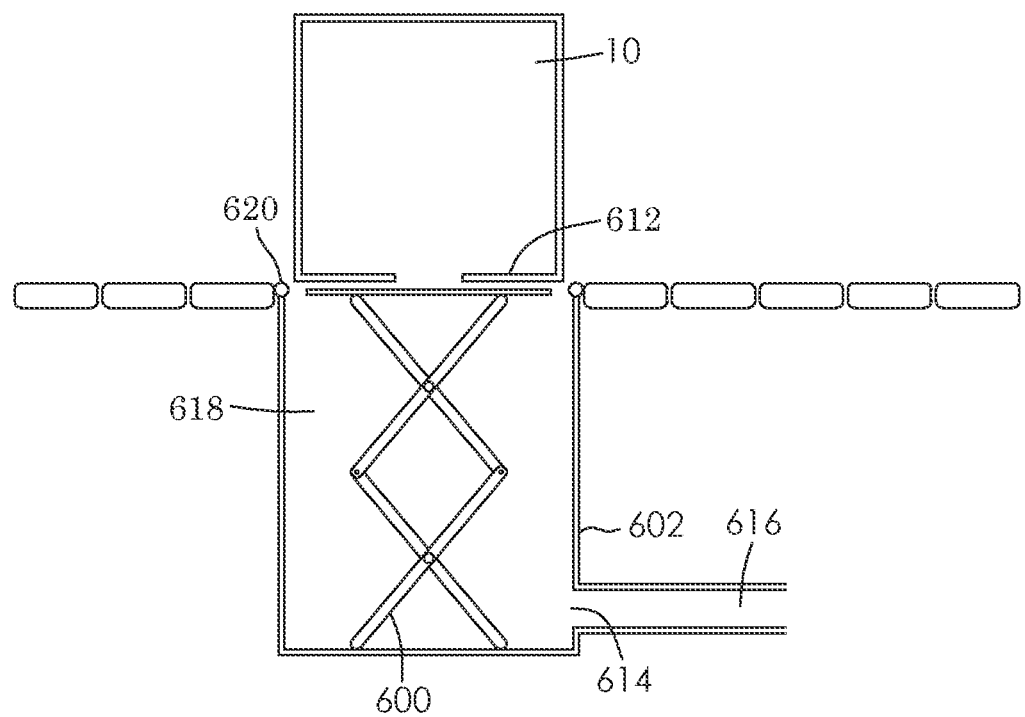

FIG. 23A is a side sectional view of an outdoor patio heater in the stowed position; and FIG. 23B is a side sectional view of the outdoor patio heater in the operational position.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Gas-fired—in the context of the present technology, gas-fired, as in a gas fireplace or gas burner includes natural gas, propane and any other gaseous fuel suitable to be burned in an outdoor patio heater.

Air pressurizing device—in the context of the present technology, an air pressurizing device is any device that is configured to push or pull air through the interstitial channels. An air pressuring device includes but is not limited to a fan, a vacuum or a pump.

DETAILED DESCRIPTION

A gas-fired outdoor patio heater, generally referred to as 10 is shown in FIG. 1. In one embodiment, the heater 10 has a top 12, two sides 14, a front 16, a back 18 and a base 20. In other embodiments, the heater is pyramidal, cylindrical (round or oval in cross section), multisided and the like. The rectangular heater 10 shown in FIG. 1 may be taller than it is wide and deep, shorter than it is wide or shorter than it is deep.

Figure 2:
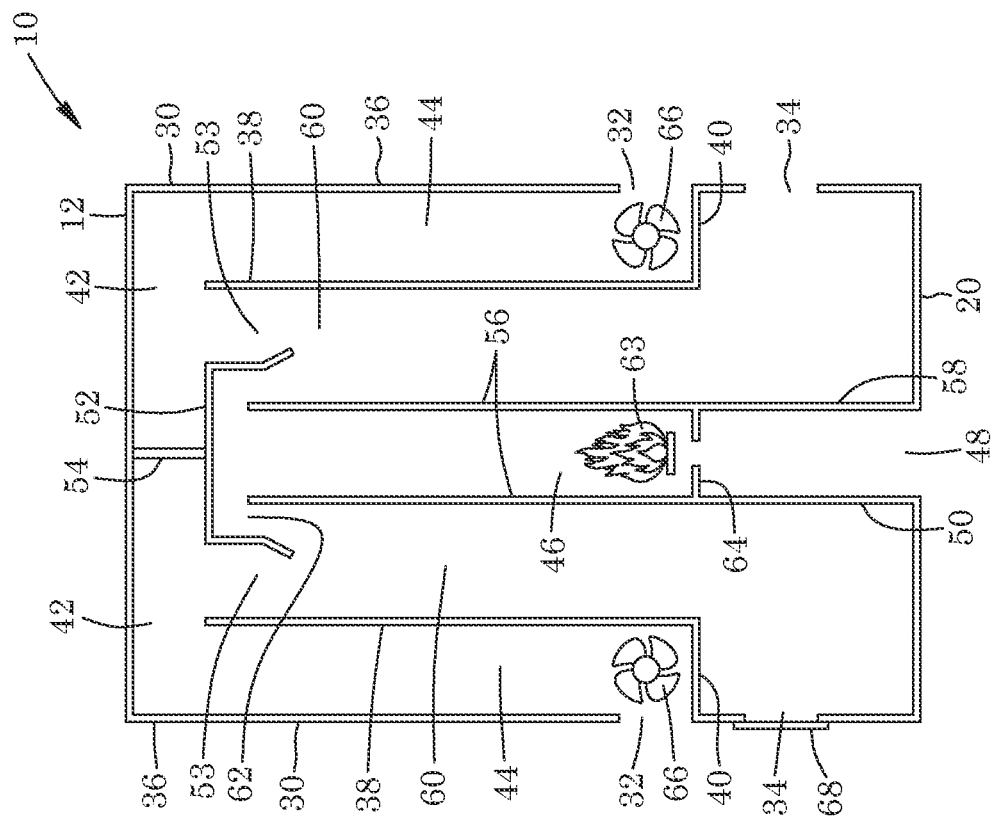
FIG. 2 is a side sectional view of the outdoor patio heater of FIG. 1.

As shown in FIG. 2, the heater 10 has a glass or plastic polymeric second wall 30 on each side 14 that is attached to the top 12, base 20 and sides 14 with brackets. An inlet 32 in each second wall 30 is located proximate to the base 20. Below the inlet 32 is a heated air outlet 34 in each second wall 30. The second wall 30 is transparent and is either coated with a layer 36 of switchable privacy film or is switchable privacy glass. A first wall 38 is attached to the second wall 30 below the inlet 32 with a leg 40 of the inlet 32 and the sides 14 with brackets, extends upward from the inlet 32 and terminates proximate to the top 12, leaving a channel 42 between the first wall 38 and the top 12. The second wall 30 and the first wall 38 define a second interstitial passageway 44. The first wall 38 is tempered glass. A combustion chamber 46 is centrally located between the first walls 38. A combustion air inlet 48 is located in the base 20 or is located proximate to the base 20 and is in fluid communication with the combustion chamber 46 via a duct 50. The combustion chamber 46 extends from the duct 50 towards the top 12. It is terminated with a combustion chamber outlet cap 52, which is spaced apart from the top 12 with a strut 54. The combustion chamber 46 is ceramic glass. The first wall 38 and the combustion chamber outlet cap 52, the combustion chamber walls 56 and the wall 58 of the duct 50 define a first interstitial passageway 60 which is in fluid communication with the second interstitial passageway 44 and the exhaust ports 62 of the combustion chamber outlet cap 52. The combustion chamber outlet cap 52 includes an angled distal member which creates a venturi 53 with the first wall 38. The strut 54 separates the two channels 42 and two first interstitial passageways 60 from each other. Within the combustion chamber 46 is a burner assembly 63 which is located on the combustion chamber base 64. A fan 66 is located within the second interstitial passageway 44 proximate to the inlet 32. An optional cover plate 68 is located over the heated air outlet 34 on one side and the first interstitial passageways 60 are in fluid communication with each other around the walls 58 of the duct 50. This causes the warm air to be expelled from one side of the heater 10. The heater 10 therefore is a convection heater.

In an alternative embodiment, the second wall 30 is opaque and may be metal, glass or a combination of metal and glass. The use of switchable privacy film, switchable privacy glass or an opaque material allow the heater 10 to function as a partition, while heating a zone. This provides privacy and physical distancing between patrons or users.

Figure 3:
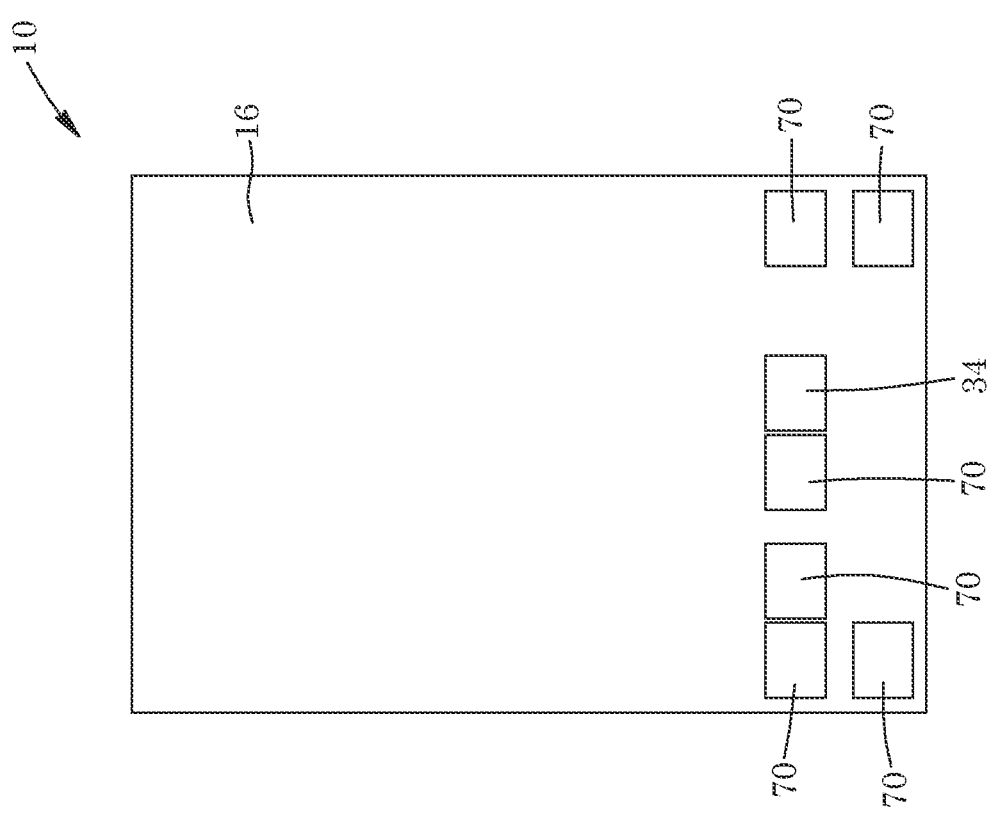
FIG. 3 is a perspective view of an alternative embodiment of FIG. 1.

In an alternative embodiment, each of the walls may, for example, comprise conventional 6 mm safety glass, but alternative suitable optically transparent, semi-transparent or translucent materials may be used. The interstitial passageways between adjacent walls may, for example, be about 20 to about 35 mm In an alternative embodiment shown in FIG. 3, there are multiple heated air outlets 34 with doors 70, flaps, sliders or the like to allow for opening and closing specific heated air outlets 34. This provides directional heating.

Figure 4:
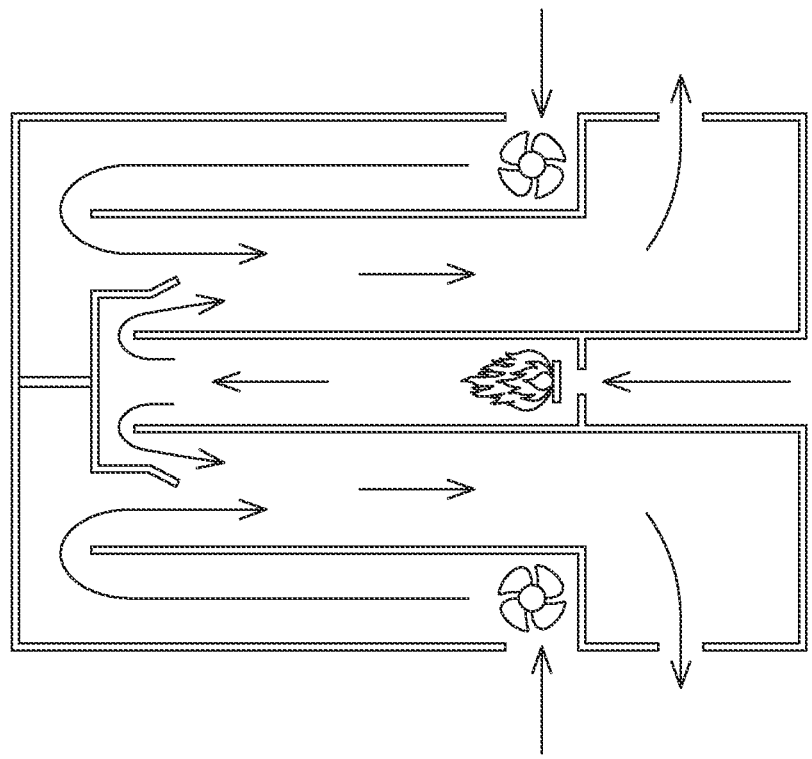
FIG. 4 is schematic side sectional view showing the paths of airflow in the outdoor patio heater of FIG. 1.

The path of airflow is shown in FIG. 4. The incoming ambient air is urged upward from the inlet 32 through the second interstitial passageway 44 through the channel 42 and down through the first interstitial passageway 60. Incoming combustion air enters through the duct 50, which extends through the base 20 as shown or through the sides 14 proximate to the base 20. Exhaust gases are vented through the exhaust ports 62 of the combustion chamber outlet cap 52 and mix with the ambient air. The air-gas mixture travels through the first interstitial passageway 60 and through the heated air outlets 34. The air in the second interstitial passageway 44 is cool, thus providing a cool second wall 30. The air-gas mixture in the first interstitial passageway 60 is heated as it travels from the combustion chamber outlet cap 52 to the heated air outlet 34.

As shown in FIG. 5A-C, the heater 10 has a mechanical and electrical box 80 either beside, below or above the combustion chamber 46. The mechanical and electrical box 80 is affixed to the combustion chamber with brackets. The mechanical and electrical box 80 holds a rechargeable battery 82 which is in electrical communication with the fan 66 and a switch 84 for the switchable privacy film or glass. A propane tank 86 is in fluid communication with the burner assembly 63. A heat controller 88 is located on the outside of the mechanical and electrical box 80 and controls a valve 88 in the gas line 90 between the propane tank 84 and the burner assembly 63.

In an alternative embodiment shown in FIG. 6, there are three walls, a third wall 90, a second wall 30 and a first wall 38. The second wall 30 is attached to the top 12, the sides 14 and to the base 20 with brackets. The ambient air inlet 32 is in the third wall 90 proximate to the top 12. The heated air outlet 34 is in the third wall 90 proximate to the base 20. The second wall 30 is attached to the lower side 92 of the inlet 32 and sides 14 with brackets and extends downward from the inlet 32. The third wall 90 is attached to the base 20 and sides 14 with brackets and extends upward towards the top 12. Thus, there is a first interstitial passageway 60, which is defined by the combustion chamber sides 56, the outer wall 58 of the duct 50 and the first wall 38. The second interstitial passageway 60 which is defined by the second wall 30 and the first wall 38 and a third interstitial passageway 94 which is defined by the second wall 30 and the third wall 90. A first channel 96 is defined by the first wall 38 and a channel bottom 98. A second channel 100 is defined by the second wall 30 and the combustion chamber outlet cap 52. The combustion chamber outlet cap 52 includes an angled distal member which creates a venturi 53 with the second wall 38. Similarly, the second wall 38 includes an angled distal end that creates a venturi 53 with the first wall 30. An air inlet 99 connects the second interstitial passageway 60 with the third interstitial passageway 94.

As shown in FIG. 7, in another embodiment, the inlet 32 is proximate to the base 20 of the outdoor patio heater 10 and the heated air outlet 34 is proximate to the top 12 of the outdoor patio heater 10. The incoming ambient air is urged up the third interstitial passageway 94, down the second interstitial passageway 44, then up through the first interstitial passageway 60, mixes with the exhaust gases that are exhausted between the inverted cap 102 and the combustion chamber sides 56, before exiting through the heated air outlet 34. The combustion chamber sides 56 includes an angled distal member which creates a venturi 53 with the second wall 38.

As shown in FIG. 8, in another embodiment, the inlet is proximate to the top 12 of the outdoor patio heater 10 and the heated air outlet 34 is in the top 12 of the outdoor patio heater 10. The incoming ambient air is urged down the second interstitial passageway 44, enters the first interstitial passageway 60, and mixes with the exhaust gases that are exhausted between the inverted cap 102 and the combustion chamber sides 56, before exiting through the heated air outlet 34. The combustion chamber sides 56 includes an angled distal member which creates a venturi 53 with the second wall 38.

In an alternative embodiment shown in FIGS. 9A and 9B, the walls and interstitial passageways are on one side of the combustion chamber 46. As shown in FIG. 9A, there are two walls, the second wall 30 and the first wall 38. The second wall 30 is attached to the top 12, sides 14 and the base 20 with brackets. The first wall 38 is attached to the second wall 30 below the inlet 32 with a leg 40 of the inlet 32 and the sides 14 with brackets, extends upward from the inlet 32 and terminates proximate to the top 12, leaving a channel 42 between the first wall 38 and the top 12. As shown in FIG. 9B, there are three walls, the first wall 38, the second wall 30 and the third wall 90. The combustion chamber sides 56 includes an angled distal member which creates a venturi 53 with the second wall 38.

As shown in FIG. 10A, in another embodiment, the inlet 32 is located at the front 16 of the outdoor patio heater 10 and the heated air outlet 34 is located at the top 12 of the outdoor patio heater 10. The incoming ambient air is urged into the second interstitial passageway 44, then enters the first interstitial passageway 60 where it mixes with the exhaust gases, passes through a venturi 53 before exiting through the heated air outlet 34. As shown in FIG. 10B, in another embodiment, the inlet 32 is located at the front 16 of the outdoor patio heater 10 and the heated air outlet 34 is located at the top 12 of the outdoor patio heater 10. The incoming ambient air is urged into the third interstitial passageway 94, passes through a venturi 53, then to the second interstitial passageway 44 and finally enters the third interstitial passageway 60 where it mixes with the exhaust gases before exiting through the heated air outlet 34. As shown in FIG. 10C, in yet another embodiment, the inlet 32 is located at the front 16 of the outdoor patio heater 10 and the heated air outlet 34 is located at the top 12 of the outdoor patio heater 10. The incoming ambient air is urged into the second interstitial passageway 44, then enters the first interstitial passageway 60 where it mixes with the exhaust gases, passes through a venturi 53 created by the combustion chamber outlet cap 52 before exiting through the heated air outlet 34. A would be known to one skilled in the art, the venturi 53 shown in these figures is also applicable to all the other embodiments.

As shown in FIG. 11A, the outdoor patio heater 10 has a cover 150 that fits over the top 12. The ambient air inlets 32 are in the front 16 of the outdoor patio heater 10. The fans 66 are located in the ambient air inlets 32. A grill 152 in the sides 14 covers the heated air outlets 34. Alternative outlets 34 terminate ducts 154 that are locate below the outdoor patio heater 10 and are in fluid communication with the last interstitial passageway. As shown in FIG. 11B, an electric element 156 may be in fluid communication with the outlets 34.

In alternative embodiments, the inlet 32 and heated air outlet 34 are positioned as shown in FIG. 7 or 8.

In another embodiment, there are virtually unlimited numbers of walls (a first wall and a second wall through to X wall). The walls may be a solid, opaque walls.

As shown in FIG. 12, a row of two or more heaters 10 can be used to form a patio divider or privacy wall, generally referred to as 200 which provides physical distancing between patrons and provides heat. Brackets 202 attach the heaters 10 to one another. At each end 204, 206 of the patio divider 200, the heater 10 includes structural tubing 208 to accept a leg of an event tent. As there is no open flame and the top 12 of the heater 10 can be positioned to be a suitable distance from the combustion chamber outlet cap 52 to ensure that it is not at a combusting temperature, patrons can be both provided with heat and shelter. If the heaters 10 have a first wall 38 and a second wall 30 or a first wall 38, a second wall 30 and a third wall 90 on one side of the heater, one or more of the walls may be transparent, translucent or opaque. Similarly, if the electrical and mechanical box 80 is on the back of the heater 10, the walls may be transparent, translucent or opaque.

An installation of two patio dividers 200 and an event tent 210 are shown in FIG. 13. The legs 212 are retained in the structural tubing 208 which is at or proximate the outside corner 214.

In another installation, shown in FIGS. 14A and 14B, the structural tubing 208 is located between the outside corner 214 and the inside corner 216, or is at the inside corner 216. The tops 12 of the heaters 10 retain an eavestrough 218 which directs rain or meltwater to an end 204, 206 of the patio divider 200. FIG. 14A is a top view of the patio divider 200 and FIG. 14B is a side view of the patio divider 200 with the event tent 210.

In another embodiment, the heater 10 is configured to be a seat, generally referred to as 300, as shown in FIG. 15A, a bench, generally referred to as 302, as shown in FIG. 15B or a table, generally referred to as 304, as shown in FIG. 15C. Other pieces of furniture such as for example, but not limited to, include a stool and a chaise lounge.

In yet another embodiment, the heater 10 is connected to the chair 400 via a duct 402, which is in fluid communication with the heated air outlet 34, as shown in FIG. 16A or a bench 404 via a duct 402, which is in fluid communication with the heated air outlet 34, as shown in FIG. 16B. As shown in FIG. 16C, the heater is located below a table 406. As shown in FIG. 16D, the heater 10 is partly exposed as it is partly above the table 406. As shown in FIG. 16E, the heater 10 is partially below the deck or floor 408. As shown in FIG. 16F, the heater 10 is suspended below the floor 408 or ceiling 408.

As shown in FIG. 17, the outdoor patio heater 10 may be integrated into an exterior wall 306 with the front 16 facing onto a balcony or patio. The incoming ambient air is from the room inside the exterior wall. The fan 66 can be powered by an electrical outlet in the room.

As shown in FIG. 18, the outdoor patio heater 10 may include a patio umbrella 350. As the top 12 is cool to the touch, the patio umbrella 350 is integral with the outdoor patio heater 10. The mechanical and electrical box 80 forms the base. The second wall 30 is shown. All the walls are cylindrical.

In an alternative embodiment, the walls are semi-cylindrical.

The outdoor patio heater 10 is shown on a deck in FIG. 19. The mechanical and electrical box 80 forms the base.

The outdoor patio heater 10 may also contain one or more of an electric element, heat pump, heat exchanger, air-cleaner, infrared elements or other accessories. The inclusion of the electric element, heat pump, infrared elements or heat exchanger allow the outdoor patio heater 10 to be a hybrid heater. Further, the heat pump allows the outdoor patio heater 10 to expel cooled air. In an alternative embodiment, the fan 66 is located in any one of the interstitial passageways. Further, a combustion fan may be located in the combustion air inlet 48 or in the duct 50.

As shown in FIG. 20A, an outdoor patio hybrid heater, generally referred to as 448 includes an electric element 450 and a fan 452 at or proximate to a heated air outlet 454 which connects to a duct 456 which in turn connects with outdoor furniture or seating 458. The outdoor furniture or event seating 458 has at least one hollow passageway 460 in the frame 461 which terminates in at least one vent 462. In one embodiment, shown in FIG. 20B, the outdoor furniture is a mesh chair, generally referred to as 464 with an airtight backing 466 to provide a heating chamber 468. The heated air from the outdoor patio hybrid heater 448 exits the heated air outlet 454, passes through the ducting 456, enters the heating chamber 468 and then exits through the mesh back 470 of the mesh chair 464. In another embodiment the heater is a gas heater. In all embodiments, a pressure release valve may be included such that the warm air flows only when a person is seated. In all embodiments, a heat pump 474 may be included in the unit. The heat pump allows the outdoor patio hybrid heater 448 to expel cooled air. In all embodiments, an infrared heater 476 may be included. To heat multiple pieces of outdoor furniture, the ducting 456 forms a manifold 480.

As shown in FIG. 21A, the outdoor patio hybrid heater 448 with the heated air outlet 454 is attached to a manifold, generally referred to as 480. The manifold 480 has one or more channels 482 that extend the length of a set of stairs and a heating chamber 486 in each stair 488. Each stair 486 has an inlet 490 which is fluid communication with the channel 482 and the heating chamber 486 and a plurality of vents 492. The vents 492 are preferably in the tread 494. In another embodiment the heater is a gas heater. In yet another embodiment, the heater is an electric heater.

In another embodiment, shown in FIG. 21B, the manifold 480 is configured as a deck, generally referred to as 500. The vents 492 are preferably in the upper surface 502 of the deck 500. In another embodiment the heater is a gas heater. In yet another embodiment, the heater is an electric heater.

In another embodiment, shown in FIG. 22, the outdoor patio hybrid heater 448 with the heated air outlet 454 is attached to a hollow handrail 510. A single vent 512 is located at one end of the bore 514 of the handrail 510 and the inlet 516 is at the other end of the bore 514. In another embodiment the heater is a gas heater.

Other embodiments include defrosting glass on balcony railings, de-ice garage door seals and the like—essentially any application that allows for ducting to connect the heater to a structure with hollow vented item or a structure with a surface upon which the heated air can be blown.

In all embodiments, the outdoor patio hybrid heater 448 may include all the components of the convection heater 10.

As shown in FIG. 23A, the outdoor patio heater 10 is mounted on a lift mechanism 600. The lift mechanism 600 may be a scissor lift, a hydraulic ram, a pneumatic ram and the like, with the preferred being a scissor lift. The lift mechanism 600 is mounted in a box 602 which is mounted below a deck or patio 604, such that the top 606 of the outdoor patio heater 10 is flush with the upper surface 608 of the deck or patio 604 when in the retracted position. The outdoor patio heater 10 is configured to vent the heated air from a heated air outlet 610 in the base 612. The box 602 includes at least one outlet 614. Extending outward from the box 602 and in fluid communication with the outlet 614 is at least one duct 616 which leads to an area or piece of furniture to be heated. The lift mechanism 600 is under the control of an actuator which may be a switch or a controller which may be a microprocessor.

As shown in FIG. 23B, when the outdoor patio heater 10 is in the operational position, a manifold 618 is created by the box 602 and the base 612 of the outdoor patio heater 10. A gasket 620 seals the manifold 618. While the gas line and electrical wires flex as the outdoor patio heater 10 is raised and lowered, the duct 616 remains static. Any number of ducts 614 can be in fluid communication with the manifold 618.

In an alternative embodiment, the outdoor patio heater 10 is the outdoor patio hybrid heater 448. In all embodiments, the fan may be replaced with another air pressurizing device to provide motive force to draw or push ambient air through the interstitial passageways.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. An outdoor gas heater installation, the outdoor gas heater installation comprising a box, a lift mechanism, at least one duct and a convection outdoor gas heater, wherein:
the box includes sides, a bottom and at least one outlet;
the lift mechanism is housed within the box;
the at least one duct is in fluid communication with the outlet; and the convective outdoor gas heater comprises: a top; a base; a pair of sides; a first wall which is attached to the top, the base and the pair of sides; a combustion chamber which includes combustion chamber wall and a combustion chamber outlet, the combustion chamber outlet proximate to the top or in the top, the combustion chamber wall spaced apart from the first wall to define a first interstitial passageway, the first interstitial passageway in fluid communication with the combustion chamber outlet; a gas burner assembly which is housed in the combustion chamber; a leg extending outward from the first wall; a second wall, which is attached to the pair of sides and the leg and is spaced apart from the first wall to define a second interstitial passageway, the second interstitial passageway in fluid communication with the first interstitial passageway; a base which supports the first wall, the second wall and the combustion chamber; a combustion air inlet in fluid communication with the combustion chamber; an air inlet in fluid communication with the second interstitial passageway; an air pressurizing device in fluid communication with the first interstitial passageway and the second interstitial passageway; and an outlet in the base which is in fluid communication with the first interstitial passageway, wherein the convective outdoor gas heater is mounted on the lift mechanism and in a stowed position is housed within the box and in an operational position, the base and the box form a manifold.

2. The outdoor gas heater installation of claim 1, wherein the combustion chamber outlet is a venturi.

3. The outdoor gas heater installation of claim 2, wherein the air pressuring device is a fan.

4. The outdoor gas heater installation of claim 3, wherein the fan is in the second interstitial passageway.

5. The outdoor gas heater installation of claim 4, further including a mechanical and electrical box in communication with the fan and the lift mechanism.

6. The outdoor gas heater installation of claim 5, wherein the first wall, the first interstitial passageway, the second wall, the second interstitial passageway and the air inlet are mirrored on a second side of the combustion chamber of the convective outdoor gas heater.

7. The outdoor gas heater installation of claim 6, wherein the first wall and the second wall are transparent, semi-transparent or translucent.

8. The outdoor gas heater installation of claim 7, wherein the convective outdoor gas heater further includes a third wall outside of the second wall, the third wall and the second wall defining a third interstitial passageway which is in fluid communication with the second interstitial passageway via the air inlet and which includes an ambient air inlet.

9. The outdoor gas heater installation of claim 8, wherein the first wall, the first interstitial passageway, the second wall, the second interstitial passageway, the third wall, the third interstitial passageway and the air inlet are mirrored on a second side of the combustion chamber of the convection gas heater.

10. The outdoor gas heater installation of claim 9, wherein the first wall, the second wall and the third wall are transparent, semi-transparent or translucent.

11. The outdoor gas heating installation of claim 10, wherein the convective outdoor gas heater further comprises at least one additional heating source, the additional heating source selected from the group consisting of an electric element, a heat pump, an infrared element and a heat exchanger.

12. The outdoor gas heating installation of claim 11, further comprising:

ducting, which is in fluid communication with the outlet; and a hollow structure which is in fluid communication with the ducting, the hollow structure selected from the group consisting of at least one article of outdoor furniture, a stair tread, a handrail, event seating and a deck, wherein the convective outdoor gas heater is in fluid communication with the hollow structure via the ducting.

* * * * *

UNITED STATES PATENT AND TRADEMARK OFFICE
CERTIFICATE OF CORRECTION

| | |
|---|---|
| PATENT NO. | : 11,530,818 B2 |
| APPLICATION NO. | : 17/715921 |
| DATED | : December 20, 2022 |
| INVENTOR(S) | : Walter Wardrop et al. |

Page 1 of 1

It is certified that error appears in the above-identified patent and that said Letters Patent is hereby corrected as shown below:

On the Title Page

Item (30) should be corrected to reflect the foreign priority claim to CA 3102578 filed December 14, 2020.

Signed and Sealed this
Twenty-first Day of March, 2023

*Katherine Kelly Vidal*

Katherine Kelly Vidal
*Director of the United States Patent and Trademark Office*